United States Patent [19]

Ishii

[11] Patent Number: 5,910,116
[45] Date of Patent: Jun. 8, 1999

[54] ULTRASONIC DIAGNOSTIC APPARATUS THAT REGENERATES IMAGE SIGNALS ACCORDING TO A NON-INTERLACE SCHEME

[75] Inventor: Yuichiro Ishii, Kawasaki, Japan

[73] Assignee: Fujitsu Limited, Kawasaki, Japan

[21] Appl. No.: 09/100,321

[22] Filed: Jun. 19, 1998

[30] Foreign Application Priority Data

Jan. 30, 1998 [JP] Japan .................................. 10-019749

[51] Int. Cl.⁶ .................................................... A61B 8/00
[52] U.S. Cl. ........................................... 600/443; 600/441
[58] Field of Search ................................. 600/437, 441, 600/443; 348/401, 280; 358/88

[56] References Cited

U.S. PATENT DOCUMENTS 5,421,332  6/1995  Ishii et al. ................................. 600/443
5,588,433  12/1996  Shirai et al. .............................. 600/441
5,655,535  8/1997  Friemel et al. ........................... 600/443

*Primary Examiner*—Marvin M. Lateef
*Assistant Examiner*—Ali M. Imam
*Attorney, Agent, or Firm*—Staas & Halsey

[57] ABSTRACT

There is provided an ultrasonic diagnostic apparatus in which ultrasonic waves are transmitted into the subject, the ultrasonic waves reflected within the subject are received to obtain received signals, and an image is displayed in accordance with the received signals thus obtained. The ultrasonic diagnostic apparatus has a CRT display according to the non-interlace scheme and a VTR according to the interface scheme. Image signals according to the non-interface scheme are converted into image signals according to the interlace scheme for recording onto the VTR. Image signals according to the non-interlace scheme are regenerated on the basis of only one of images on odd number lines and images of even number lines represented by the image signals according to the interlace scheme outputted from the VTR, so that an image is displayed in accordance with the image signals thus regenerated.

10 Claims, 12 Drawing Sheets

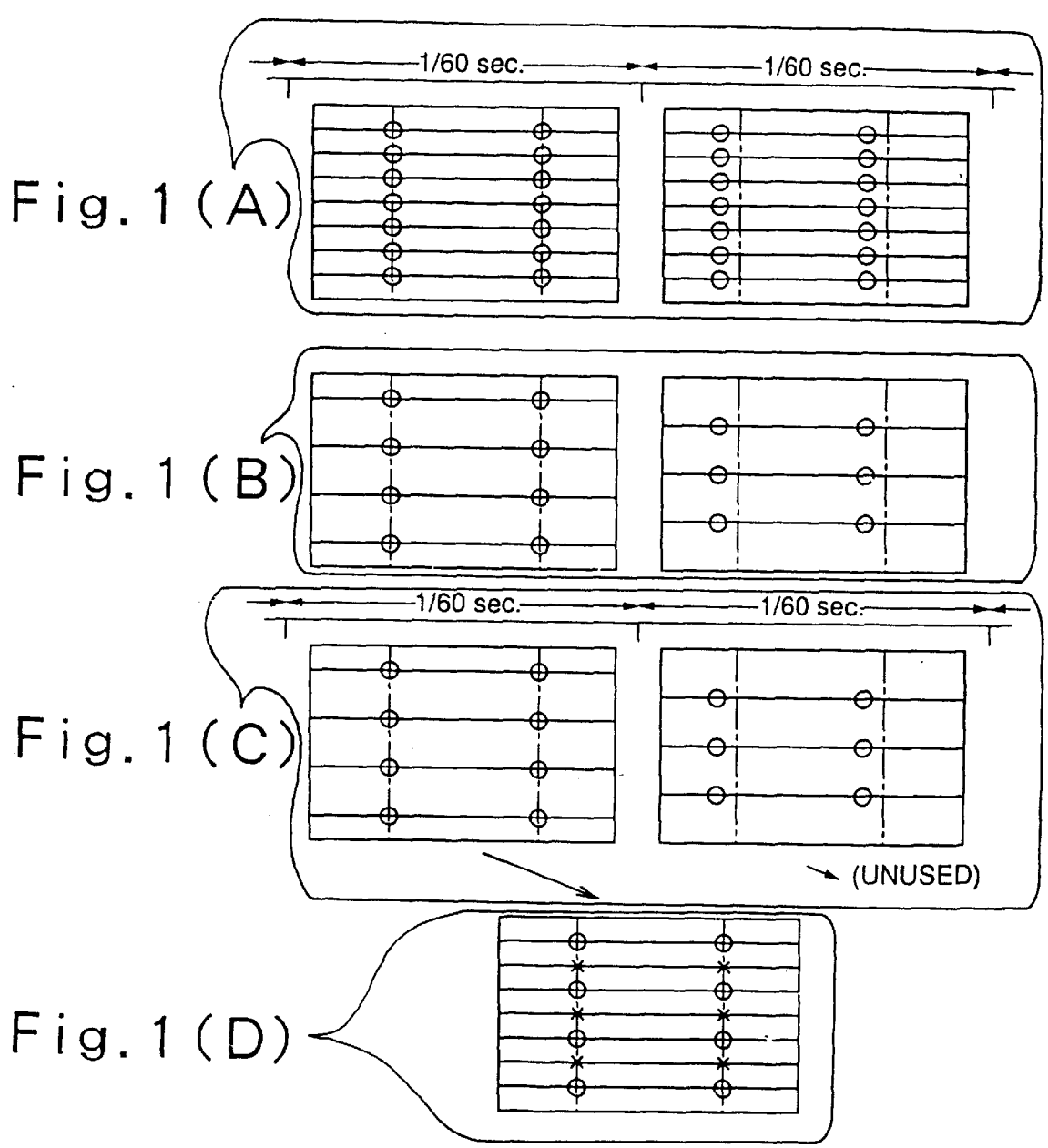

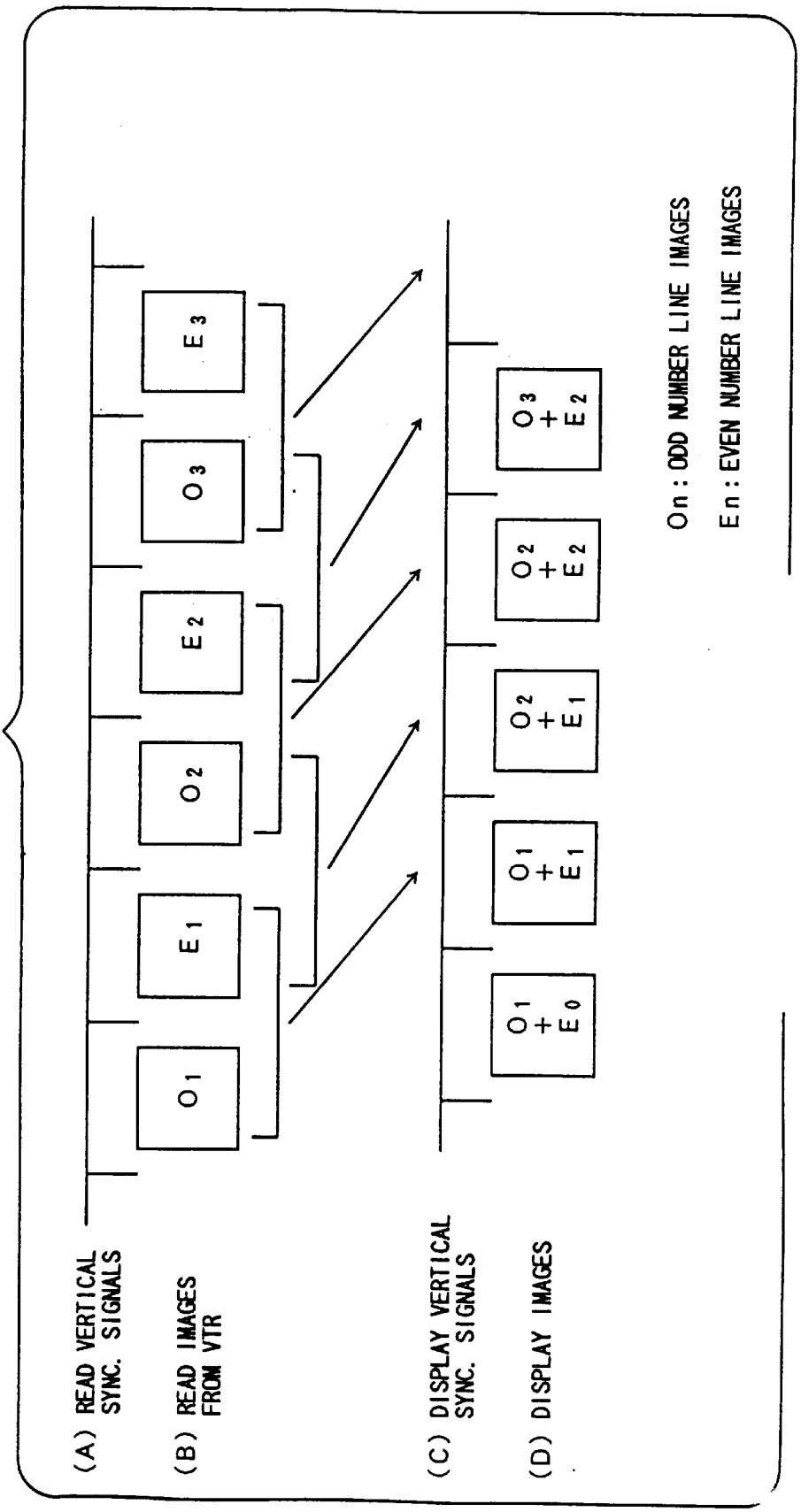

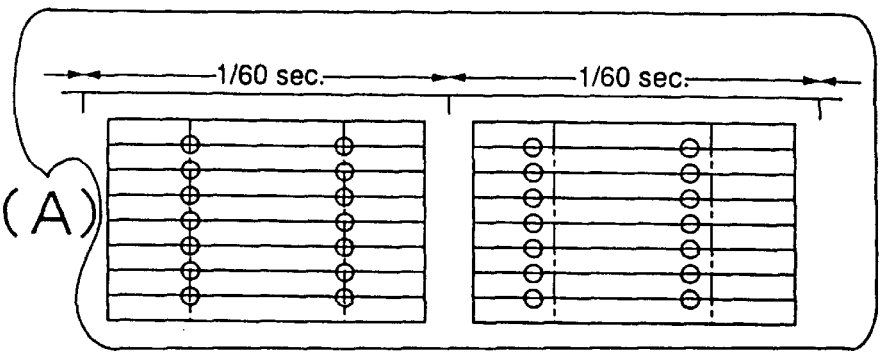
Fig. 1 1 (A)
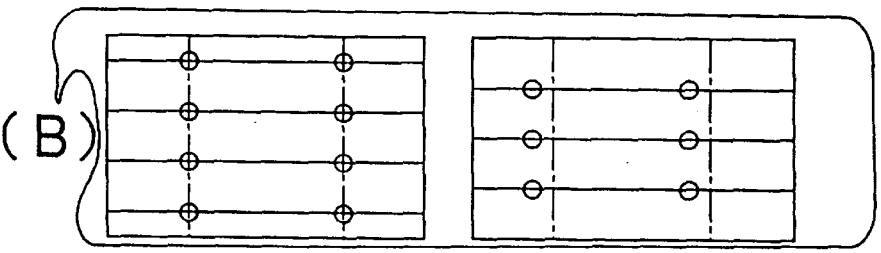
Fig. 1 1 (B)
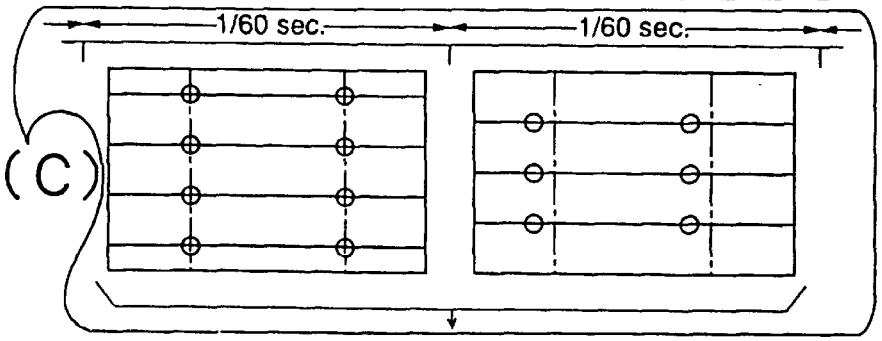
Fig. 1 1 (C)
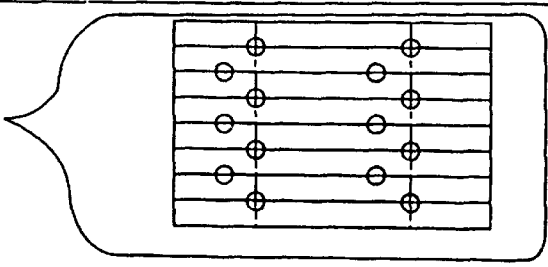
Fig. 1 1 (D)

ULTRASONIC DIAGNOSTIC APPARATUS THAT REGENERATES IMAGE SIGNALS ACCORDING TO A NON-INTERLACE SCHEME

BACKGROUND OF THE INVENTION

1. Field of the Invention

The present invention relates to an ultrasonic diagnostic apparatus in which ultrasonic waves are transmitted into the subject, the ultrasonic waves reflected within the subject are received to obtain received signals, and an image is displayed in accordance with the received signals thus obtained.

2. Description of the Related Art

Hitherto, an ultrasonic diagnostic apparatus, in which ultrasonic waves are transmitted into the subject, particularly the human body, the ultrasonic waves reflected on tissues within the subject are received to obtain received signals, and an image of the inside of the subject is produced in accordance with the received signals thus obtained, has been widely used for the purpose of diagnoses of a disease of the inside of the subject.

Such an ultrasonic diagnostic apparatus has usually a function of producing images to be altered at high frame rate, and a display unit of a non-interlace scheme capable of displaying the images altered at high frame rate. Further, this type of ultrasonic diagnostic apparatus has usually also a VTR (Video Tape Recorder) for recording the images obtained. Such a VTR records and reproduces images at a frame rate suitable for the usual television in accordance with an interlace scheme suitable for the usual television.

According to the conventional ultrasonic diagnostic apparatus as described above, it is possible to directly transmit and display an image of update obtained through transmission and reception of ultrasonic waves, or alternatively to temporarily store images in a VTR and then read the images from the VTR to display the same on a display unit.

FIG. 10 is an explanatory view used for the explanation of a method of transformation from images according to an interlace scheme, which images are recorded in the VTR, into images according to a non-interlace scheme.

As mentioned above, the VTR records images according to an interlace scheme in compliance with a scheme of the usual television. On the other hand, as display units, usually, there is provided a display unit for displaying images according to a non-interlace scheme. For this reason, when images according to the interlace scheme are read from the VTR to display on the display unit, there is a need to transform images according to the interlace scheme to images according to the non-interlace scheme. Hitherto, the transformation is performed in accordance a way which will be described in conjunction with FIG. 10.

In case of images according to the interlace scheme, odd number line images Om (m=1, 2, ... ), which are a set of images of the odd number lines of the scanning lines of a television, and even number line images Em (m=1, 2, ... ), which are a set of images of the even number lines of the scanning lines of the television, are alternately repeated. In this case, alternately repeated odd number line images and even number line images are paired with one another, respectively, to generate images according to the non-interlace scheme for a display. Specifically, as shown in FIG. 10, an odd number number line image $O_1$ and an even number line image $E_1$, which are read in synchronism with a read vertical synchronization signal shown in part (A) of FIG. 10, are combined to generate a display image $O_1+E_1$ according to the non-interlace scheme. The display image $O_1+E_1$ according to the non-interlace scheme is displayed in synchronism with a display vertical synchronization signal shown in part (C) of FIG. 10. Then the even number line image $E_1$ and the next odd number line image $O_2$ are combined to generate a display image $O_2+E_1$ according to the non-interlace scheme. The display image $O_2+E_1$ according to the non-interlace scheme is displayed. Further, the odd number line image $O_2$ and the next even number line image $E_2$ are combined to generate a display image $O_2+E_2$ according to the non-interlace scheme. The display image $O_2+E_2$ according to the non-interlace scheme is displayed. This is the similar hereinafter.

By the way, in the event that the display unit according to the non-interlace scheme and the VTR according to the interlace scheme are provided, and images according to the interlace scheme read from the VTR are transformed to images according to the non-interlace scheme in accordance with a way as shown in FIG. 11 and then displayed, the following problem arises.

FIGS. 11(A)–11(D) are explanatory views used for the explanation of problems involved in transformation from images according to the interlace scheme to images according to the non-interlace scheme.

Usually, an ultrasonic diagnostic apparatus has a mode in which images are produced at a frame rate higher than that of the usual television so that a fast movement of tissues and the like within the subject can be observed. Hereinafter, there will be described problems involved in, for example, a case where images are produced at the frame rate (60 frames /second) which is twice as many as that (30 frames/second) of the usual television.

FIG. 11(A) is a typical illustration showing adjacent two frame images which are produced at intervals of 1/60 seconds in accordance with the non-interlace scheme. In case of FIG. 11(A), on the image of the left hand of the two images, there appear vertically two lines (expressed by the continuation of circle ○ marks). On the other hand, on the adjacent image of the right hand of the two images, there appear the two lines (expressed by the continuation of circle ○ marks) at the respective positions slightly shifted, as a result of the fact that the vertical lines move to the side during 1/60 seconds.

In order for recording onto the VTR, frame images (each consisting of a pair of odd number line image and even number line image) are produced at intervals of 1/30 seconds. Accordingly, as shown in FIG. 11(B), only the odd number lines are extracted from the frame image of the left hand of FIG. 11(A) to produce an odd number line image (an image of the left hand of FIG. 11(B)). On the other hand, only the even number lines are extracted from the frame image of the right hand of FIG. 11(A) to produce an even number line image (an image of the right hand of FIG. 11(B)). Thus, images according to the interlace scheme, which consist of repetition of the odd number line image and the even number line image produced in the manner as mentioned above, are recorded onto a VTR.

Next, as shown in FIG. 11(C), images according to the interlace scheme, which are recorded on the VTR, are read from the VTR, and the odd number frame image and the even number frame image thus read are combined to produce an image according to the non-interlace scheme. The image thus produced is a composition of two images (FIG. 11(A)) according to the interlace scheme, which are mutually shifted in time by 1/60 seconds. Consequently, as shown in FIG. 11(D), this brings about such a result that a line, which is to be essentially a straight line extending vertically, appears as a line shaped in zigzags between the odd number lines and the even number lines. Thus, there is raised such a problem that a zigzag is conspicuous and as a result the image is hard to see. When it is intended that a quick motion of tissues within the subject is observed, transmission and reception of ultrasonic waves are narrowed down to an area of interest to reproduce the quick motion, so that a high frame rate of image can be obtained. In this case, when a high frame rate of image is obtained for the purpose of an observation of the quick motion, a rate of thinning is increased with higher frame rate for the purpose of an observation of the quick motion, since the frame rate of the VTR is fixed, for example, on 30 frames/sec. Thus, when an image once recorded onto the VTR is reproduced, the phenomenon (which is referred to as a false image) as in FIG. 11(D) will be more conspicuous.

As a case where the false image is conspicuous even if a frame rate is relatively law, there is raised a so-called scroll image. A scroll image means an image representative of changes with time as to information on a certain point within the subject, or information on a certain scanning line within the subject, wherein the image is scrolled in a time axis direction. Typically, the scroll image means, for example, a scrolled image in which reflection intensity of ultrasonic waves on the respective points of a certain scanning line within the subject is expressed on a vertical axis, while a time axis is given in the form of a horizontal axis, and the image is representative of changes with time as to reflection intensity of ultrasonic waves on the respective points of the certain scanning line. In such a scroll image, old portions of the image on a time basis are sequentially erased, the image is shifted along the horizontal axis (in the time axis direction) while new portions of the image on a time basis are sequentially added.

In such a scroll image, false images are often to be conspicuous because it changes with time.

SUMMARY OF THE INVENTION

In view of the foregoing, it is therefore an object of the present invention to provide an ultrasonic diagnostic apparatus having a function that a regeneration of images recorded on a VTR involves no occurrence of false images, or alternatively simply produces false images which are hard to be conspicuous.

To achieve the above-mentioned object of the invention, according to the present invention, there is provided a first ultrasonic diagnostic apparatus comprising:

an ultrasonic transmit-receive unit for repeating a process that ultrasonic waves are transmitted into a subject, and the ultrasonic waves reflected within the subject are received to obtain received signals;

an image generating unit for sequentially generating a plurality of frames of image signals according to a non-interlace scheme in accordance with the received signals obtained in said ultrasonic transmit-receive unit;

an image signal transformation unit for transforming the image signals according to the non-interlace scheme sequentially generated in said image generating unit into image signals according to an interlace scheme;

a recording unit for recording the image signals according to the interlace scheme obtained in said image signal transformation unit;

an image regenerating unit for regenerating image signals according to the non-interlace scheme using only either one of image signals representative of images on odd number lines and images on even number lines, which constitute the image signals according to the interlace scheme read from said recording unit; and an image display unit according to the non-interlace scheme for displaying images based on the image signals generated in said image generating unit and images based on the image signals regenerated in said image regenerating unit.

According to the first ultrasonic diagnostic apparatus of the present invention, the image regenerating unit regenerates image signals according to the non-interlace scheme using only either one of image signals representative of images on odd number lines and images on even number lines. This feature makes it possible to avoid an occurrence of false images due to combining two non-interlace images mutually different in time, as shown in FIG. 11 (D).

In the first ultrasonic diagnostic apparatus according to the present invention, it is acceptable that said image regenerating unit generates a first image signal in accordance with a second image signal representative of a line included in one of an image on the odd number line and an image on the even number line, said first image signal being adjacent to the line of interest and being representative of another line not included in said one of the image on the odd number line and the image on the even number line.

In the first ultrasonic diagnostic apparatus according to the present invention, it is also acceptable that said image regenerating unit generates an image signal according to the non-interlace scheme, said image signal consisting of an image signal representative of one of an image on the odd number line and an image on the even number line, and a blank signal representative of a predetermined luminance value, said blank signal being allocated to a line not included in said one of the image on the odd number line and the image on the even number line.

Here, in case of the above, it is preferable that said ultrasonic diagnostic apparatus further comprises a luminance correction unit for correcting a luminance of an image represented by the image signal regenerated by said image regenerating unit.

In the event that an image according to the non-interlace scheme is generated by applying a blank (a predetermined luminance value) to odd number line images or even number line images, it may happen that luminance varies as a whole of the image. For this reason, the luminance correction unit is used to correct a luminance of the image.

In the first ultrasonic diagnostic apparatus according to the present invention, it is acceptable that the ultrasonic diagnostic apparatus further comprises:

a frame rate flag applying unit for applying to image signals sequentially generated in said image generating unit a frame rate flag indicative of whether a frame rate of generating said image signals is over a predetermined frame rate; and a frame rate flag detection unit for detecting the frame rate flag applied to the image signals read from said recording unit, wherein said image regenerating unit regenerates image signals according to the non-interlace scheme, using only either one of image signals representative of images on odd number lines and images on even number lines, which constitute the image signals according to the interlace scheme read from said recording unit, or alternatively using both those image signals, in accordance with an indication of the frame rate flag detected by said frame rate flag detection unit.

On the occasion of displaying images read from the recording unit, when an image according to the non-interlace scheme, which is generated from only either one of the odd number line images and the even number mine images, is displayed, it is possible to avoid an occurrence of the above-mentioned false image. However, generally, it is obliged that a picture quality is degraded as compared with a case of displaying an image according to the non-interlace scheme generated using both the odd number line images and the even number line images. For this reason, the frame rate flag applying unit and the frame rate flag detection unit are provided. In the event that the original image is of high frame rate, in other words, generally, in the event that the fast movement of tissues within the subject is observed, and also in the event that a large thinning is obliged when a fixed frame rate of image is generated for recording onto the recording unit, images according to the non-interlace scheme are regenerated on the basis of only the odd number line images, or only the even number line images. On the other hand, in the event that a low frame rate of image is regenerated, in other words, generally, in the event that the static or slow movement of tissues within the subject is observed, an extended definition of image is regenerated on the basis of both the odd number line images and the even number line images. This feature makes it possible to obtain regenerated images in which the prevention of false images and the extended definition balance with each other, as a whole.

In the first ultrasonic diagnostic apparatus according to the present invention, it is acceptable that the ultrasonic diagnostic apparatus further comprises:

a scroll flag applying unit for applying to image signals sequentially generated in said image generating unit a scroll flag indicative of whether the image signals are image signals representative of images at least partially including a scroll image which is an image representative of variation inside the subject with the passage of time, said scroll image being scrolled in a time base direction; and a scroll flag detection unit for detecting the scroll flag applied to the image signals read from said recording unit, wherein said image regenerating unit regenerates image signals according to the non-interlace scheme, using only either one of image signals representative of images on odd number lines and images on even number lines, which constitute the image signals according to the interlace scheme read from said recording unit, or alternatively using both those image signals, in accordance with an indication of the scroll flag detected by said scroll flag detection unit.

As mentioned above, on the occasion of displaying images read from the recording unit, when an image according to the non-interlace scheme, which is generated from only either one of the odd number line images and the even number line images, is displayed, it is possible to avoid an occurrence of the above-mentioned false image. However, generally, it is obliged that a picture quality is degraded as compared with a case of displaying an image according to the non-interlace scheme generated using both the odd number line images and the even number line images. For this reason, the scroll flag applying unit and the scroll flag detection unit are provided. In the event that an image, which at least partially includes a scroll image, is regenerated, images according to the non-interlace scheme are regenerated on the basis of only the odd number line images, or only the even number line images. On the other hand, in the event that an image, which does not include a scroll image, is regenerated, an extended definition of image is regenerated on the basis of both the odd number line images and the even number line images. This feature makes it possible to obtain regenerated images in which the prevention of false images and the extended definition balance with each other, as a whole.

In the first ultrasonic diagnostic apparatus according to the present invention, it is preferable that said image regenerating unit regenerates image signals according to the non-interlace scheme, using only either one of image signals representative of images on odd number lines and images on even number lines, which constitute the image signals according to the interlace scheme read from said recording unit, or alternatively using both those image signals, in accordance with an instruction, and wherein said ultrasonic diagnostic apparatus further comprises an handler for inputting the instruction.

In the event that the handler is provided, and an image read from the recorder unit is displayed, it is permitted for an operator of the ultrasonic diagnostic apparatus to select display modes between a display of images prevented in occurrence of false images and a display of extended definition of images. This feature makes it possible to display images suitable for the purpose of the operator.

Further, in the first ultrasonic diagnostic apparatus according to the present invention, it is acceptable preferable that the ultrasonic diagnostic apparatus further comprises:

a frame rate flag applying unit for applying to image signals sequentially generated in said image generating unit a frame rate flag indicative of whether a frame rate of generating said image signals is over a predetermined frame rate; and a frame rate flag detection unit for detecting the frame rate flag applied to the image signals read from said recording unit, wherein in a case where the frame rate flag detected by said frame rate flag detection unit indicates a frame rate less than a predetermined frame rate, said image regenerating unit regenerates image signals according to the non-interlace scheme, using both image signals representative of images on odd number lines and images on even number lines, which constitute the image signals according to the interlace scheme read from said recording unit, and in a case where the frame rate flag detected by said frame rate flag detection unit indicates a frame rate above the predetermined frame rate, said image regenerating unit regenerates image signals according to the non-interlace scheme, using only either one of image signals representative of images on odd number lines and images on even number lines, which constitute the image signals according to the interlace scheme read from said recording unit, or alternatively using both those image signals, in accordance with an instruction, and wherein said ultrasonic diagnostic apparatus further comprises an handler for inputting the instruction.

In the event that an image read from the recorder unit is displayed, generally, when a low frame rate is concerned, false images are hard to be conspicuous even if generated. Thus, extended definition of images are displayed impartially. On the other hand, when a high frame rate is concerned, images free from false images or extended definition of images are selectively displayed in accordance with an operational instruction. This feature also makes it possible to display images suitable for the purpose of the operator.

Furthermore, in the first ultrasonic diagnostic apparatus according to the present invention, it is acceptable preferable that the ultrasonic diagnostic apparatus further comprises:

a scroll flag applying unit for applying to image signals sequentially generated in said image generating unit a scroll flag indicative of whether the image signals are image signals representative of images at least partially including a scroll image which is an image representative of variation inside the subject with the passage of time, said scroll image being scrolled in a time base direction; and a scroll flag detection unit for detecting the scroll flag applied to the image signals read from said recording unit, wherein in a case where the scroll flag detected by said scroll flag detection unit indicates an absence of the scroll image, said image regenerating unit regenerates image signals according to the non-interlace scheme, using both image signals representative of images on odd number lines and images on even number lines, which constitute the image signals according to the interlace scheme read from said recording unit, and in a case where the scroll flag detected by said scroll flag detection unit indicates an presence of the scroll image, said image regenerating unit regenerates image signals according to the non-interlace scheme, using only either one of image signals representative of images on odd number lines and images on even number lines, which constitute the image signals according to the interlace scheme read from said recording unit, or alternatively using both those image signals, in accordance with an instruction, and wherein said ultrasonic diagnostic apparatus further comprises an handler for inputting the instruction.

In the event that an image read from the recorder unit is displayed, when the image does not include a scroll image, false images are hard to be conspicuous even if generated. Thus, extended definition of images are displayed impartially. On the other hand, when the image include a scroll image, images free from false images or extended definition of images are selectively displayed in accordance with an operational instruction. This feature also makes it possible to display images suitable for the purpose of the operator.

To achieve the above-mentioned object of the invention, according to the present invention, there is provided a second ultrasonic diagnostic apparatus comprising:

an ultrasonic transmit-receive unit for repeating a process that ultrasonic waves are transmitted into a subject, and the ultrasonic waves reflected within the subject are received to obtain received signals;

an image generating unit for sequentially generating a plurality of frames of image signals according to a non-interlace scheme in accordance with the received signals obtained in said ultrasonic transmit-receive unit;

an image signal transformation unit for transforming the image signals according to the non-interlace scheme sequentially generated in said image generating unit into image signals according to an interlace scheme;

a recording unit for recording the image signals according to the interlace scheme obtained in said image signal transformation unit; and an image display unit according to a non-interlace/interlace selection scheme for displaying images based on the image signals according to the non-interlace scheme obtained in said image signal transformation unit and images based on the image signals according to the interlace scheme read from said recording unit.

According to the second ultrasonic diagnostic apparatus, the image display unit is capable of switching over between the non-interlace scheme and the interlace scheme. Thus, when images according to the non-interlace scheme generated in the image generating unit are displayed, they are displayed on the interlace scheme. And when images according to the interlace scheme read from the recording unit are displayed, they can be displayed on the interlace scheme as it is. Therefore, according to the second ultrasonic diagnostic apparatus, while there is a need to provide an image display unit according to a non-interlace/interlace selection scheme, instead of an image display unit according to the non-interlace scheme, which is usually provided on the conventional ultrasonic diagnostic apparatus, it is possible to display images free from false images and extended definition of images in the event that images read from the recording unit are displayed.

BRIEF DESCRIPTION OF THE DRAWINGS

FIGS. 1(A)–1(D) are diagrams each used for the explanation of aspects of an ultrasonic diagnostic apparatus according to an embodiment of the present invention;

FIG. 10 is an explanatory view used for the explanation of a method of transformation from images according to an interlace scheme, which images are recorded in the VTR, into images according to a non-interlace scheme; and FIGS. 11(A)–11(D) are explanatory views used for the explanation of problems involved in transformation from images according to the interlace scheme to images according to the non-interlace scheme.

DESCRIPTION OF THE PREFERRED EMBODIMENTS

Figure 2A:
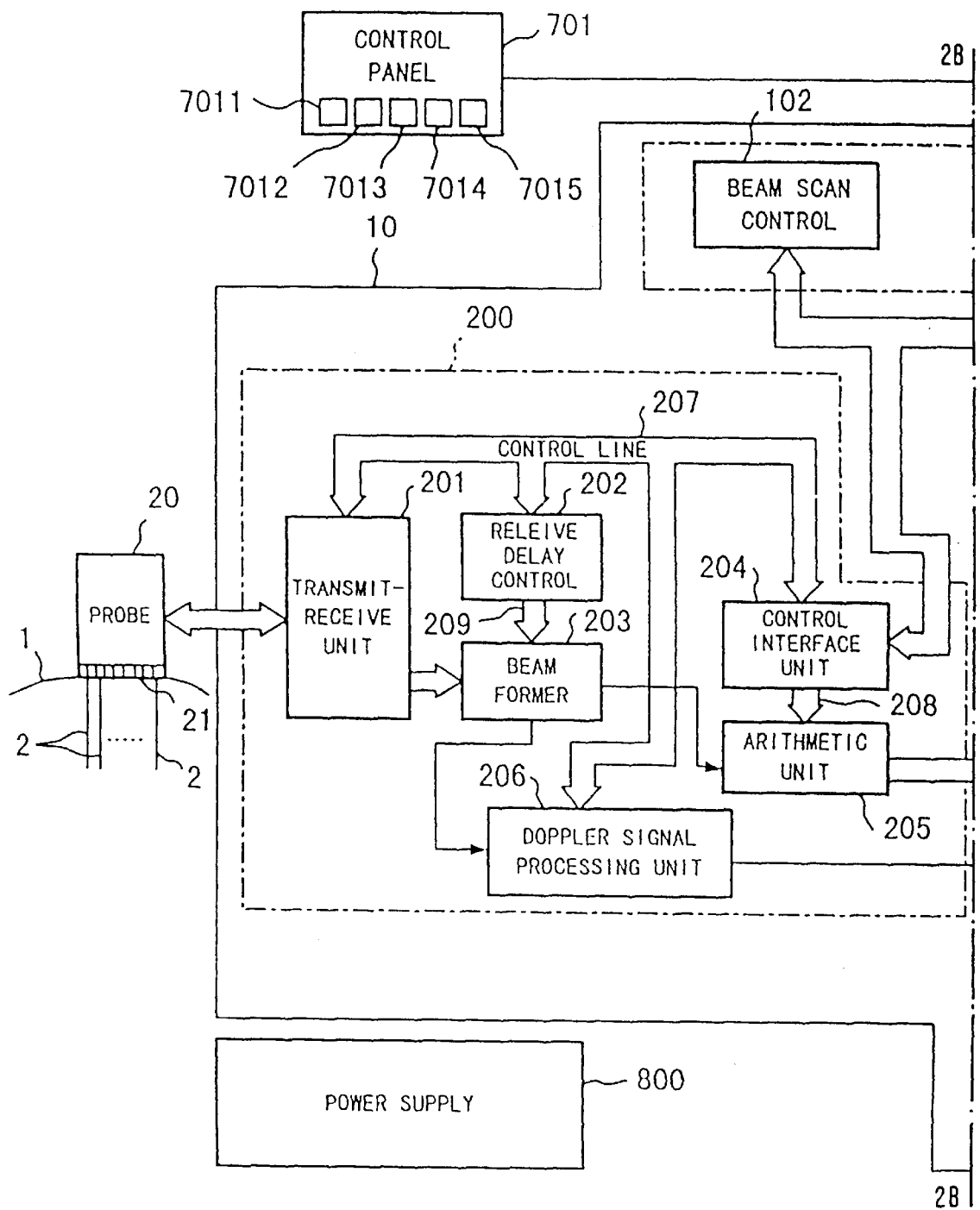
FIG. 2 is a block diagram of an ultrasonic diagnostic apparatus according to an embodiment of the present invention; used for the explanation of the principle of a way of the formation of a reception ultrasonic beam in a beamformer unit.

Hereinafter, there will be described embodiments of the present invention.

First, as to aspects of an ultrasonic diagnostic apparatus according to an embodiment of the present invention, the outline will be explained, and thereafter the structure of the ultrasonic diagnostic apparatus according to the embodiment of the present invention will be explained.

FIGS. 1(A)–1(D) are diagrams each used for the explanation of aspects of an ultrasonic diagnostic apparatus according to an embodiment of the present invention. FIGS. 1(A)–1(D) correspond to FIGS. 11(A)–11(D), respectively.

With respect to FIGS. 1(A), 1(B) and 1(C), they are similar to FIGS. 11(A), 11(B) and 11(C), respectively. FIG. 1(A) shows adjacent two frame images which are produced at intervals of 1/60 seconds in accordance with the non-interlace scheme. FIG. 1(B) shows an odd number line image (an image of the left hand of FIG. 1(B)) and an even number line image (an image of the right hand of FIG. 1(B)) according to the interlace scheme, which are obtained from the adjacent two frame images. Thus, those images according to the interlace scheme in FIG. 1(B) are recorded onto a VTR. FIG. 1(C) shows the odd number line image (left side) and the even number line image (right side) read from the VTR. Here, of the odd number line image and the even number line image, only the odd number line image is used to reproduce the image according to the non-interlace scheme shown in FIG. 1(D).

When the image according to the non-interlace scheme shown in FIG. 1(D) is produced from the odd number line image shown in the left side of FIG. 1(C), images (○ marks) of the odd number lines, which constitute the odd number line image, are copied on the even number lines to produce images (x marks) of the even number lines, and those images thus obtained are combined, so that the images according to the non-interlace scheme are reproduced. Here, the even number line image is not used.

Thus, while information on the even number line image is lost and as a result degradation of the picture quality by the corresponding degree cannot be avoided, it is possible to prevent an occurrence of the false image due to a movement of the subject, as explained referring to FIGS. 11(A)–11(D), and rather on images which involve an occurrence of the false image, possible to contribute to the improvement of the picture quality.

According to the above explanation, as to the even number lines, the odd number lines are copied. However, it is acceptable to obtain the even number lines through an interpolation arithmetic operation, instead of copying, or alternatively, it is also acceptable to allocate a predetermined luminance value, for example, a luminance value indicative of black, a luminance value indicative of white, etc. to the even number lines.

Further, according to the above explanation, images according to the non-interlace scheme are produced on the basis of the odd number line image. It is acceptable, however, that the images according to the non-interlace scheme are reproduced by means of copying the even number lines are copied on the odd number lines on the basis of the even number line image, practicing the interpolation arithmetic operation, or allocating a predetermined luminance value to the odd number lines.

Next, there will be described the structure of the ultrasonic diagnostic apparatus according to the embodiment of the present invention.

Figure 2B:
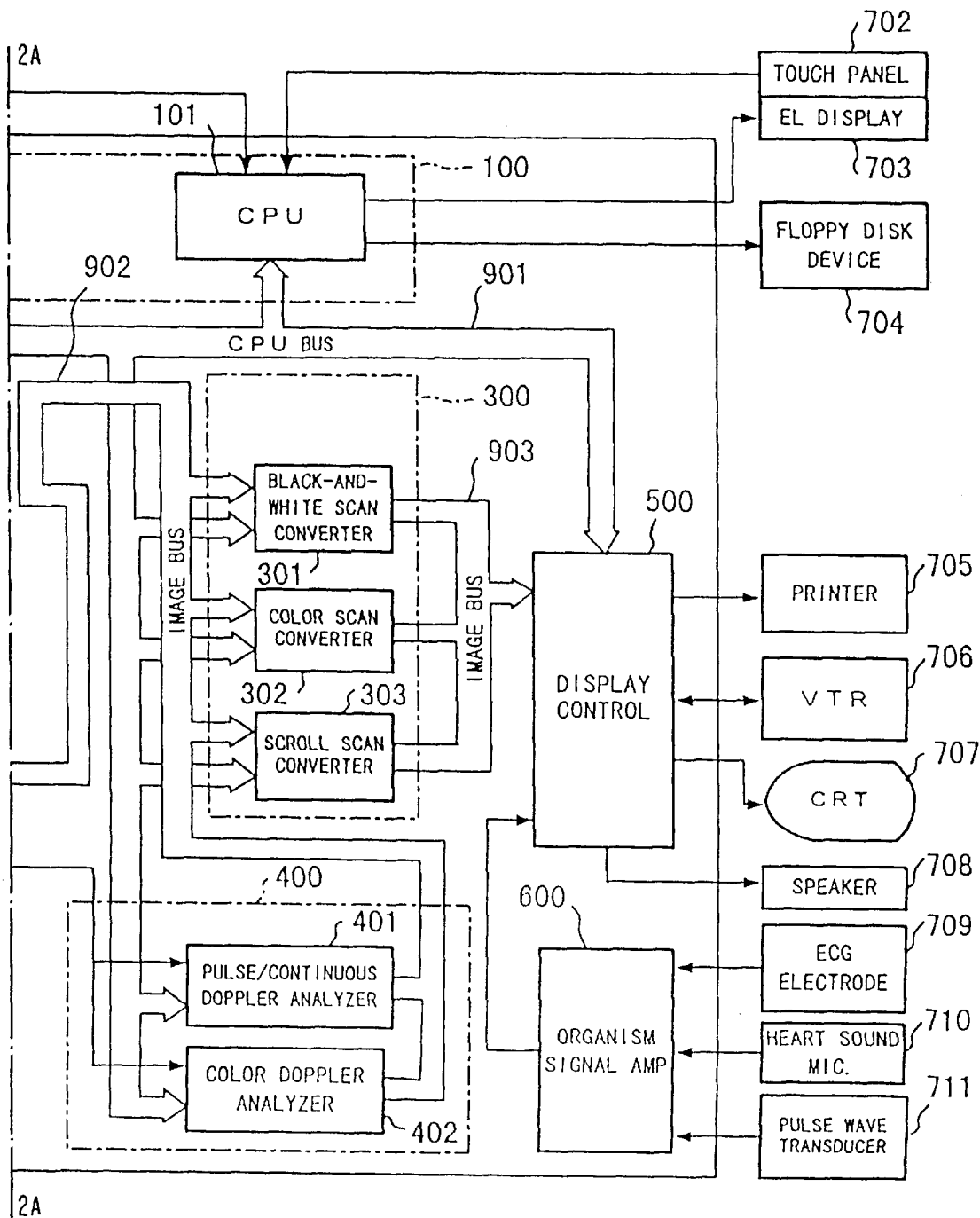

FIG. 2 is a block diagram of an ultrasonic diagnostic apparatus according to an embodiment of the present invention. There will be described an outline of the ultrasonic diagnostic apparatus referring to this block diagram.

First, there will be described a structure of the ultrasonic diagnostic apparatus hereinafter.

A main frame 10 of the ultrasonic diagnostic apparatus comprises a control unit 100, a signal processing unit 200, a digital scan converter unit 300, a Doppler processing unit 400, a display control unit 500 and an organism signal amplifier unit 600.

The control unit 100 comprises a CPU 101 and a beam scan control unit 102. Connected to the CPU 101 are a control panel 701, a unitary body of touch panel 702 and EL display 703, and a floppy disk device 704.

The signal processing unit 200 comprises a transmit-receive unit 201, a receive delay control unit 202, a beam-former unit 203, a control interface unit 204, an arithmetic unit 205 and a Doppler signal processing unit 206. The control interface unit 204, the transmit-receive unit 201, the receive delay control unit 202, and the Doppler signal processing unit 206 are connected to one another via a control line 207. Further, the control interface unit 204 is connected via a control line 208 to the arithmetic unit 205. The receive delay control unit 202 and the beamformer unit 203 are connected to one another via a control line 209. Detachably connected to the transmit-receive unit 201, which constitutes the signal processing unit 200, is an ultrasonic probe 20, by the maximum, four pieces of ultrasonic probe 20.

The digital scan converter unit 300 comprises a black-and-white scan converter 301, a color scan converter 302 and a scroll scan converter 303.

The Doppler processing unit 400 comprises a pulse/continuous wave Doppler analyzing unit 401 and a color Doppler analyzing unit 402.

The display control unit 500 is illustrated with a single block. Connected to the display control unit 500 are a printer 705, a VTR (Video Tape Recorder) 706, a CRT display 707 and a speaker 708.

The organism signal amplifier unit 600 is also illustrated with a single block. Connected to the organism signal amplifier unit 600 are an ECG electrode unit 709, a heart sound microphone 710 and a pulse wave transducer 711.

The CRT display 707 has a function of displaying a color image according to the non-interlace scheme, and is capable of displaying images, which are produced at a high speed of frame rate, such as images produced, for example, at 1/60 seconds intervals, and also images which are produced at a frame rate less than the high speed of frame rate as noted above. On the other hand, the VTR 706 is for recording and reproducing images according to the interlace scheme, and its frame rate is 1/30 seconds which is fixed on a frame rate for producing one frame image. Here, a frame image is a combination of images of the odd number lines and images of the even number lines. Consequently, in order to record and reproduce one frame image at 1/30 seconds, images of the odd number lines are recorded and reproduced at 1/60 seconds, and images of the even number lines are recorded and reproduced at the next 1/60 seconds.

The ultrasonic diagnostic apparatus further comprises a power source unit 800 connected to a commercial power supply for supplying necessary power to individual sections of the ultrasonic diagnostic apparatus.

The main frame 10 has a CPU bus 901 for connecting the CPU 101 and the beam scan control unit 102, which constitute the control unit 100, the control interface unit 204, which constitutes the signal processing unit 200, the black-and-white scan converter 301, the color scan converter 302 and the scroll scan converter 303, which constitute the digital scan converter unit 300, the pulse/continuous wave Doppler analyzing unit 401 and the color Doppler analyzing unit 402, which constitute the Doppler processing unit 400, and the display control unit 500 with each other. The main frame 10 further has an image bus 902 for supplying image data generated from the arithmetic unit 205, which constitutes the signal processing unit 200, to the digital scan converter unit 300. With respect to data generated from the pulse/continuous wave Doppler analyzing unit 401 and the color Doppler analyzing unit 402, which constitute the Doppler processing unit 400, such data are also supplied through the image bus 902 to the digital scan converter unit 300. The main frame 10 further has an image bus 903 for transmitting a video signal generated from anyone of the black-and-white scan converter 301, the color scan converter 302 and the scroll scan converter 303, which constitute the digital scan converter unit 300, to the display control unit 500.

The control panel 701 consists of a keyboard having a number of keys, various types of operation buttons, etc. When the control panel 701 is operated, operation information is detected by the CPU 101, so that an instruction associated with the operation information is transmitted to the beam scan control unit 102, the control interface unit 204, the digital scan converter unit 300, or the display control unit 500 in accordance with the instruction. In FIG. 2, of the various types of operation buttons of the control panel 701, there are illustrated by way of example an image source selection button 7011, a frame rate setting button 7012, a regeneration mode selection button 7013, an odd number/even number selection button 7014 and a display mode selection button 7015, which will be described later.

The EL display unit 703 has a liquid-crystal display screen. The CPU 101 serves as an EL line drawing generating unit for generating an EL line drawing to be displayed on the liquid-crystal display screen of the EL display unit 703, too. The EL line drawing generated in the CPU 101 is displayed on the liquid-crystal display screen of the EL display unit 703. The liquid-crystal display screen of the EL display unit 703 is provided with the touch panel 702. When an operator touches the touch panel 702 by his fingers, position information representative of the associated touched position on the touch panel 702 is transmitted to the CPU 101. The touch panel 702 and the EL display unit 703 are arranged, so that various types of instructions to the ultrasonic diagnostic apparatus can be readily inputted, in such a manner that, for instance, when it is instructed to the ultrasonic diagnostic apparatus through an operation of the control panel 701 that a parameter as to a certain mode is set up for the ultrasonic diagnostic apparatus, the CPU 101 causes the EL display unit 703 to display a table of a number of parameters to be set up for the selected mode, so that an operator touches the touch panel 702 by his fingers to set up a desired parameter.

The floppy disk device 704 is a device onto which a floppy disk (not illustrated) is detachably loaded, wherein the loaded floppy disk is accessed. The CPU 101 causes instructions made by an operator through an operation of the control panel 701 and the touch panel 702 to be written into the floppy disk loaded onto the floppy disk device 704. When the power supply of the ultrasonic diagnostic apparatus is turned on, or when a reset to the initial state is instructed through an operation of the control panel 701, various types of instruction information, which are stored in the floppy disk device 704 loaded onto the floppy disk device 704, are read out therefrom and fed to the CPU 101 so that the CPU 101 sets up the individual sections of the ultrasonic diagnostic apparatus to the initial state in accordance with the instruction information. There will exist a number of parameters to be set up by an operator through an operation of the control panel 701 and the touch panel 702, which are needed when the ultrasonic diagnostic apparatus is operated. It will be very troublesome for the operator to do over again a setting of such a number of parameters, for example, whenever the power supply turns on. For this reason, parameters of the initial state, etc. are written in the floppy disk beforehand, and when the power supply of the ultrasonic diagnostic apparatus is turned on, or when a reset to the initial state is instructed, the parameters and the like stored in the floppy disk are read out therefrom to set up the individual sections of the ultrasonic diagnostic apparatus in accordance with the parameters and the like thus read, thereby contributing to an enhancement of efficiency in setting the parameters and the like.

The CPU 101, which constitutes the control unit 100, mainly serves as a man-machine interface, as mentioned above. On the other hand, the beam scan control unit 102, which also constitutes the control unit 100, is mainly in charge of the control, for example, of timing of transmit and receive of ultrasonic waves in the ultrasonic diagnostic apparatus, which needs an operational ability on a real-time basis. According to this type of ultrasonic diagnostic apparatus, when transmit and receive of ultrasonic waves are performed, data of controlling the individual sections constituting the signal processing unit 200 are transmitted from the beam scan control unit 102 through the CPU bus 901 to the control interface unit 204, so that the control interface unit 204 controls via a control line 207 the transmit-receive unit 201, the receive delay control unit 202, and the Doppler signal processing unit 206. Further, the control interface unit 204 controls via a control line 208 the arithmetic unit 205. The receive delay control unit 202 controls the beamformer unit 203 via the control line 209 under control of the control interface unit 204.

The transmit-receive unit 201 is coupled to the ultrasonic probe 20. With respect to the ultrasonic probe, there exist, for example, a linear scan type of ultrasonic probe, a convex scan type of ultrasonic probe, and a sector scan type of ultrasonic probe. As an especial type of ultrasonic probe, there is a type of ultrasonic probe to be inserted into a body cavity. Further, with respect to those various types of ultrasonic probes, there exist many types of ultrasonic probes, which may be classified in accordance with a difference in frequency of the ultrasonic waves to be used. In order that a ultrasonic probe is loaded on the main frame 10, a connector (not illustrated) is used. The main frame 10 end is provided with four connectors adapted to be connected to ultrasonic probes. Thus, as mentioned above, it is possible to simultaneously load onto the connectors the ultrasonic probes, by the maximum 4 pieces, of the above-mentioned various types of ultrasonic probes. When a ultrasonic probe is loaded on the main frame 10, the main frame 10 may identify information as to which type of ultrasonic probe is loaded. Such information is transmitted via the control line 207, the control interface unit 204 and the CPU bus 901 to the CPU 101. On the other hand, the control panel 701 issues an instruction as to which ultrasonic probe is used among the ultrasonic probes connected to four connectors of the main frame 10 end, when the ultrasonic diagnostic apparatus is used. Such an instruction is transmitted via the CPU bus 901 to the beam scan control unit 102. Data associate with the ultrasonic probe to be used is transmitted from the beam scan control unit 102 via the CPU bus 901, the control interface unit 204 and the control line 207 to the transmit-receive unit 201. Upon receipt of the instruction, the transmit-receive unit 201 transmits high voltage pulses (which will be described latter) to the ultrasonic probe 20 thus indicated to generate ultrasonic waves, and receives signals which are received by the ultrasonic probe 20. Here, it is assumed that the ultrasonic probe 20, as shown in FIG. 2 by one, is selected for transmission and reception of ultrasonic waves.

The ultrasonic probe 20 shown in FIG. 2 is a so-called linear scanning type of ultrasonic probe. On the tip of the ultrasonic probe 20, there are arranged a plurality of ultrasonic transducers 21, which are put to a surface of the subject 1 (particularly human body) to transmit and receive ultrasonic waves. In this condition, high voltage pulses for transmission and reception of ultrasonic waves are applied from the transmit-receive unit 201 to the plurality of ultrasonic transducers 21, respectively. The high voltage pulses applied to the plurality of ultrasonic transducers 21 are controlled in a relative time difference under control of the control interface unit 204. Ultrasonic pulse beams are transmitted from the plurality of ultrasonic transducers 21 along anyone of a plurality of scan lines 2 extending to the inside of the subject 1 in such a manner that the focus of the ultrasonic pulse beams is adjusted on a predetermined depth position inside of the subject 1 in accordance with a control of the relative time difference as to the application of the high voltage pulses to the plurality of ultrasonic transducers 21.

Attributes of the ultrasonic pulse beams to be transmitted, that is, directions of the ultrasonic pulse beams, a depth position of the focal point, a center frequency, etc., are determined by control data transmitted from the beam scan control unit 102 via the CPU bus 901 to the control interface unit 204.

This control data is generated in the beam scan control unit 102 in such a manner that a limit of the area of interest within the subject, a frame rate for the image formation, etc., which are set up through the control panel 701, are interpreted by the CPU 101 and information thus interpreted is transmitted to the beam scan control unit 102. Specifically, according to the present embodiment, the frame rate for the image formation is set up through the frame rate setting button 7012.

The ultrasonic pulse beam, which is transmitted from the ultrasonic transducer 21, is reflected on the individual points on the one scan line during travelling inside the subject 1, and returns to the ultrasonic probe 20 so that the reflected ultrasonic waves are received by the plurality of ultrasonic transducers 21. A plurality of received signals, which are obtained through receiving the reflected ultrasonic waves, are supplied to the transmit-receive unit 201 so as to be amplified by a plurality of preamplifiers (not illustrated) of the transmit-receive unit 201, and then fed to the beamformer unit 203. The beamformer unit 203 is provided with an analog delay line (not illustrated) having a number of center taps. The center taps are selected in operation to receive the plurality of received signals transmitted from the transmit-receive unit 201 in accordance with a control of the receive delay control unit 202, whereby the plurality of received signals are relatively delayed and added together in current. Controlling a relative delay pattern as to the plurality of received signals may emphasize the reflected ultrasonic waves in the direction along the scan line identical with the scan line associated with the time of the ultrasonic wave transmission, and forms a so-called received ultrasonic beam in which the focus of the ultrasonic pulse beams is adjusted on a predetermined depth position inside of the subject 1. Since ultrasonic waves travel slowly inside of the subject 1 as compared with a rate of the signal processing, it is possible to implement a so-called dynamic focus in which the focus is sequentially shifted to the deeper position inside of the subject while receiving the ultrasonic waves along one scan line. In this case, the center taps of the analog delay line are switchingly selected by the receive delay control unit 202 in response to the signals sequentially obtained by the ultrasonic transducers, even during once receiving associated with once transmitting the ultrasonic pulse beam.

Also attributes of the received ultrasonic beams, that is, directions of the received ultrasonic beams, a position of the focal point, etc., are determined by the control data transmitted from the beam scan control unit 102 via the CPU bus 901 to the control interface unit 204, and further transmitted via the control line 207 to the receive delay control unit 202. The receive delay control unit 202 controls the beamformer unit 203 in accordance with the control data in the manner as mentioned above.

According to the above-mentioned explanation, the high voltage pulses are applied to the ultrasonic transducers 21 to transmit the ultrasonic pulse beam. In this case, as mentioned above, since ultrasonic waves travel slowly inside of the subject as compared with a rate of the signal processing, it is possible, through measuring time from a starting time of application of the high voltage pulses to the ultrasonic transducers 21 to a time of receive of the reflected ultrasonic waves by the ultrasonic transducers 21, to identify the signal obtained at that time concerned with receiving of the reflected ultrasonic waves with respect to the association of the reflected ultrasonic wave with the depth position inside of the subject. That is, the feature that the ultrasonic wave to be transmitted is shaped as a pulse may provide a resolution with respect to the depth direction of the subject. Usually, in this manner, the high voltage pulses are applied to the ultrasonic transducers 21. In the special case, however, on condition that it is permitted to have no resolution with respect to the depth direction of the subject, it happens that a continuously repetitive high voltage pulse train signal is applied to the ultrasonic transducers 21 to transmit ultrasonic beams in the form of a continuous wave.

Also hereinafter, the ultrasonic diagnostic apparatus will be explained on the assumption that a pulse-like shaped ultrasonic beam is transmitted, except for a case that when the pulse/continuous wave Doppler analyzing unit 401, which constitutes the Doppler processing unit 400, is explained, the continuous wave is referred to.

In the manner as mentioned above, the transmit-receive unit 201 and the beamformer unit 203 sequentially repeatedly perform transmission and reception of the ultrasonic pulse beams along each of a plurality of scanning lines 2 inside of the subject 1, so that signals thus generated, each representative of the reception ultrasonic beam along each of the scanning lines, are sequentially fed to the arithmetic unit 205. In the arithmetic unit 205, the received signals are subjected to logarithmic compression, detection, and filtering processings, etc. according to a designation issued from the control panel 701 as to which depth area inside of the subject 1 an image is to be displayed concerned with, that is, a designation as to whether it is sufficient that an image concerned with only the shallow area inside of the subject 1 is displayed, or a designation as to what degree of depth area an image is to be displayed concerned with. The received signals thus processed are converted into digital of received signals by an A/D converter unit, and the digital of received signals thus generated are outputted from the arithmetic unit 205. The received signals outputted from the arithmetic unit 205 are fed via the image bus 902 to the black-and-white scan converter 301, which constitutes the digital scan converter unit 300. The black-and-white scan converter 301 applies an interpolation arithmetic processing for producing data associated with the pixels for display, and converts the inputted received signal to an image signal for a display, and then transmits the image signal for a display via the image bus 903 to the display control unit 500. The display control unit 500 causes the CRT display 707 to display a B-mode image caused by the ultrasonic reflection intensity distribution on the tomographic plane of the subject defined by a plurality of scan lines 2. At that time, if necessary, it is possible to display patient's names, photographing date, photographing conditions, etc. superposing on the B-mode image. As the B-mode image, it is possible to display a dynamic image representative of the state in which the inside of the subject 1 moves, a static image at a certain time, or an image in a certain phase of a movement of the heart of a human body, which is synchronized with the movement of the heart, in accordance with a synchronizing signal generated from the organism signal amplifier unit 600.

Connected to the organism signal amplifier unit 600 are the ECG electrode unit 709, the heart sound microphone 710 and the pulse wave transducer 711. The organism signal amplifier unit 600 generates the synchronizing signal in accordance with any one of these elements or a plurality of sensors, and transmits the same to the display control unit 500.

Connected to the display control unit 500 are the CRT display 707, and the printer 705 and the VTR (Video Tape Recorder) 706 as well. The display control unit 500 outputs images displayed on the CRT display 707 to the printer 705 or the VTR 706 in accordance with an instruction from an operator.

Again, an explanation will be continued from the signal processing unit 200.

When it is desired to know time variation of information as to the reflection of ultrasonic waves on a certain one scan line extending to the inside of the subject, the ultrasonic waves are repeatedly transmitted and received along a certain one scan line of interest, and data representative of the received ultrasonic beam of the subject along the one scan line is transmitted via the image bus 902 to the scroll scan converter 303. The scroll scan converter 303 generates an image signal representative of an image (an M-mode image) in which the ultrasonic reflection intensity distribution in the depth direction of the subject along the one scan line is given in the longitudinal direction, and the lateral axis consists of a time axis, wherein the image is scrolled in the time axis direction. The image signal thus generated is fed via the image bus 903 to the display control unit 500, so that an image based on the image signal is displayed, for example, on the CRT display 707.

The display control unit 500 has a function such that the image signal representative of the B-mode image transmitted from the black-and-white scan converter 301 and the image signal representative of the M-mode image transmitted from the scroll scan converter 303 are arranged side by side, and in addition a function such that a color mode image, which will be described later, is superposed on the B-mode image. The CRT display 707 is adapted to display thereon a plurality of images being arranged side by side in accordance with an instruction from an operator, alternatively display a plurality of images being superposed. As seen from the above, the ultrasonic diagnostic apparatus is associated with a number of display modes. It is possible to optionally select a desired display mode by operating the display mode selection button 7015 of the control panel 701.

Again, returning to the explanation of the signal processing unit 200, the Doppler signal processing unit 206, which constitutes the analog processing unit 200, serves as a structure element for determining a blood flow distribution of the inside of the subject, or a blood flow distribution at a certain point or on a certain one scan line. In the Doppler signal processing unit 206, a received signal representative of the reception ultrasonic beam generated in the beamformer unit 203 is subjected to a so-called quadrature detection and in addition converted into digital data through an A/D conversion. The data, which has been subjected to the quadrature detection, is outputted from the Doppler signal processing unit 206, is fed to the Doppler processing unit 400. The Doppler processing unit 400 comprises the pulse/continuous wave Doppler analyzing unit 401 and the color Doppler analyzing unit 402. Here, it is assumed that the data outputted from the Doppler signal processing unit 206 is fed to the color Doppler analyzing unit 402. The color Doppler analyzing unit 402 determines data representative of a blood flow distribution on an area of interest (ROI) on the B-mode image, which is designated by an operator, by an auto-correlation operation based on data obtained through performing, for example, eight times of ultrasonic transmit and receive on each scan line. The data representative of a blood flow distribution on the area (ROI) is fed via the image bus 902 to the color scan converter 302. The color scan converter 302 converts the data representative of a blood flow distribution on the area (ROI) into an image signal suitable for a display, and transmits the image signal to the display control unit 500. The display control unit 500 superimposes a color mode image, in which a blood in a direction coming near the ultrasonic probe 20, a blood in a direction going away from the ultrasonic probe 20, and a blood velocity are represented by, for example, red, blue and luminance, respectively, on the area (ROI) of the B-mode image transmitted from the black-and-white scan converter 301, and causes those images to be displayed on the CRT display 707. Thus, it is possible to grasp the outline of the blood flow distribution on the area (ROI).

When an operator inputs a requirement to observe in detail a blood at a certain one point on the area (ROI) or on a certain one scan line, then the transmit-receive unit 201 repeats a lot of number of times of transmit and receive of the ultrasonic waves in a direction along a one scan line passing through the one point of interest, or a direction along the one scan line of interest. And data, which is generated in the the Doppler signal processing unit 206 in accordance with the signals thus obtained by the repetitive transmit and receive of the ultrasonic waves, is fed to the pulse/continuous wave Doppler analyzing unit 401 constituting the Doppler processing unit 400. When it is interested in the a blood flow at a certain point, a pulse-like shaped ultrasonic beam is transmitted into the subject. On the other hand, when it is desired to obtain blood information excellent in S/N ratio, permitting that blood information on a certain one scan line is averaged, a ultrasonic beam is transmitted in the form of a continuous wave into the subject.

The pulse/continuous wave Doppler analyzing unit 401 performs an FFT (Fast Fourier Transform) operation based on data obtained through carrying out a lot of number of times of transmit and receive of the ultrasonic waves on a certain one point, or a certain one scan line to obtain blood flow information on the one point, or blood flow information averaged on the one scan line. Data representative of the blood flow information obtained in the pulse/continuous wave Doppler analyzing unit 401 is fed via the image bus 902 to the scroll scan converter 303. The scroll scan converter 303 generates an image signal representative of an image in which the longitudinal axis and the lateral axis denote a blood flow velocity and a time axis, respectively, and the image may scroll in a direction of the time axis. This image signal is fed via the video bus 903 to the display control unit 500. The display control unit 500 causes the image signal to be displayed on the CRT display 707 together with the B-mode image transmitted from the black-and-white scan converter 301, for example.

The digital scan converter unit 300 produces image signals according to the non-interlace in view of the fact that the CRT display 707 displays images according to the non-interlace. The CRT display 707 has a function of receiving image signals separated into three colors of R (red), G(green) and B(blue) and displaying a color image. In view of the foregoing, the digital scan converter unit 300 produces image signals separated into three colors of R(red), G(green) and B(blue), respectively, with respect to the color image.

The image signals generated in the digital scan converter unit 300 are transmitted via the image bus 903 to the display control unit 500. The display control unit 500 transmits the image signals thus received to the CRT display 707 to display an image based on the image signals thus transmitted. When the recording is performed, the image signals fed to the display control unit 500 are fed also to the VTR 706. The VTR 706 is, as mentioned above, to perform recording and reproduction of images according to the interlace. Further, in the VTR 706, the frame rate is fixed. Thus, the display control unit 500 transforms the image signals according to the non-interlace scheme, which are inputted via the image bus 903, to image signals (image signals representative of the odd number lines and image signals representative of the even number lines) according to the interlace scheme, so that the image signals according to the interlace scheme, which are obtained through the transformation, are recorded onto the VTR 706. It is noted that a process of transformation of image signals according to the non-interlace scheme into image signals according to the interlace scheme is shown, for example, in FIGS. 1(A) and 1(B) and FIGS. 11(A) and 11(B).

When the image source selection button 7011 of the control panel 701 is operated to set up an image source to the VTR 706, image signals outputted from the VTR 706 are fed to the display control unit 500. The display control unit 500 transforms the image signals according to the interlace scheme, which are fed from the VTR 706, to the image signals according to the non-interlace scheme and transmits the same to the CRT display 707 in which an image outputted from the VTR 706 is displayed. It is noted that a process of transformation of image signals according to the interlace scheme outputted from the VTR 706 into image signals according to the non-interlace scheme is shown, for example, in FIGS. 1(C) and 1(D).

Hereinafter, there will be explained a structure for implementing a transformation of image signals from the non-interlace scheme to the interlace scheme, and a transformation of image signals from the interlace scheme to the interlace scheme, in the display control unit 500.

Figure 3:
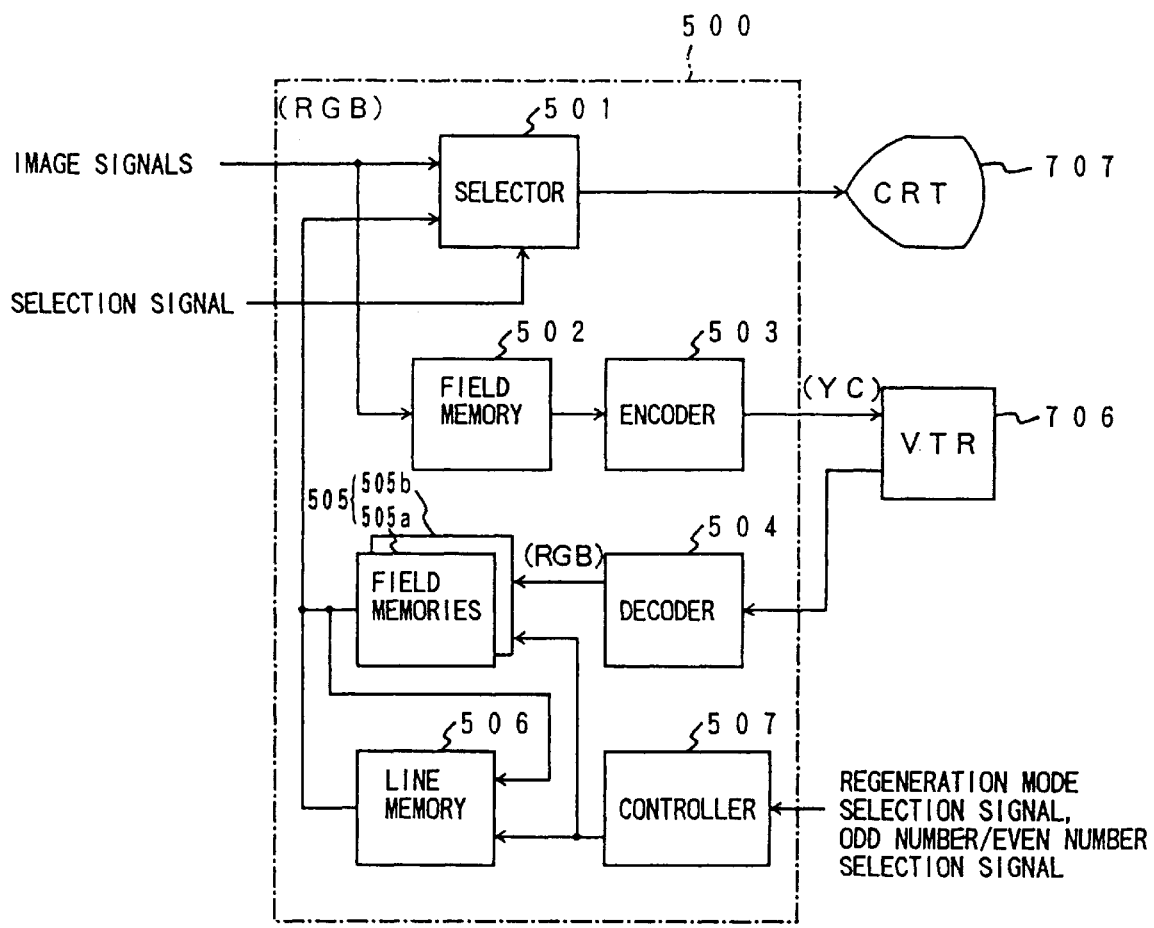
FIG. 3 is a block diagram showing by way of example a first structure of the display control unit of the ultrasonic diagnostic apparatus shown in FIG. 2.

FIG. 3 is a block diagram showing by way of example a first structure of the display control unit of the ultrasonic diagnostic apparatus shown in FIG. 2.

The display control unit 500 shown in FIG. 3 receives image signals via the image bus 903 shown in FIG. 2, and receives a selection signal via the CPU bus 901. The selection signal is for selection as to whether image signals entered through the image bus 903 are fed to the CRT display 707, or image signals outputted from the VTR 706 are fed to the CRT display 707. The selection signal is switched by an operation of the image source selection button 7011 of the control panel 701. While the image signal may be an image signal representative of the black-and-white image, for example, the image signal representative of the M-mode image, here the image signal is, for the purpose of generality, an image signal representative of a color image, which consists of a set of image signals of three colors of R, G and B.

The display control unit 500 shown in FIG. 3 receives also a regeneration mode selection signal and an odd number/even number selection signal.

The regeneration mode selection signal is for a mode selection between a mode (cf. FIGS. 1(A)–1(D)) in which image signals according to the interlace scheme are regenerated from either only one of the odd number line image or the even number line image represented by the image signal read from the VTR 706, and a mode (cf. FIG. 10 and FIGS. 11(A)–11(D)) in which image signals according to the non-interlace scheme are regenerated from both the odd number line image and the even number line image. The regeneration mode selection signal is switched over by an operation of the regeneration mode selection button 7013 of the control panel 701. The odd number/even number selection signal is effective only in the event that the regeneration mode selection signal indicates the mode in which image signals according to the interlace scheme are regenerated from either only one of the odd number line image or the even number mine image. The odd number/evennumber selection signal is for selection as to whether imagesignals according to the non-interface scheme are to be regenerated from the odd number line image or the even number line image.

An image signal fed via the image bus 903 (cf. FIG. 2) to the display control unit 500 is applied to a selector 501. When the selector 501 is set up in accordance with a selection signal to a mode in which an image based on the image signal fed via the image bus 903 is displayed, the image signal is supplied via the selector 501 to the CRT display 707 to display an image based on the image signal thus supplied. Further, the image signal fed via the image bus 903 to the display control unit 500 is applied also to a field memory 502 to be temporarily stored therein. And only the odd-number line on a certain image and only the even number line on a certain image are read from the field memory 502 and then fed to an encoder 503. As mentioned above, the image signal fed via the image bus 903 to the display control unit 500 is a set of image signals of three colors of R, G and B according to the non-interlace scheme. The encoder 503 converts the image signals of three colors of R, G and B to a YC signal consisting of a luminance signal and a color signal.

That is, the combination use of the field memory 502 and the encoder 503 may converts the image signals of three colors of R, G and B according to the non-interlace scheme to the YC signal consisting of a luminance signal and a color signal, which is a signal according to the interlace scheme representative of the odd number line image and the even number line image. The YC signal according to the interlace scheme is recorded onto the VTR 706. In the event that the VTR 706 is a VTR for recording composite signals, as the encoder 503, there is used an encoder for converting the image signals of three colors of R, G and B to the composite signals.

In the event that the image recorded on the VTR 706 is regenerated, the YC signal according to the interlace scheme is read from the VTR 706 and then fed to a decoder 504 for converting the YC signal read from the VTR 706 into the image signals of three colors of R, G and B. The image signals converted in the decoder 504 are stored in a field memory 505. The field memory 505 comprises a field memory 505a for odd number line image and a field memory 505b for even number line image.

A controller 507 receives the regeneration mode selection signal and the odd number/even number selection signal. When the regeneration mode selection signal indicates that both the odd number line image and the even number line image are used to regenerate the image signals according to the non-interlace scheme, the controller 507 controls the field memory 505a and the field memory 505b in such a manner that signals on the odd number lines and signals on the even number lines are alternately read from the field memory 505a and the field memory 505b to generate image signals according to the non-interlace scheme. On the other hand, when the regeneration mode selection signal indicates that either only one of the odd number line image and the even number line image is used to regenerate the image signals according to the non-interlace scheme, the controller 507 controls the field memory 505a and the field memory 505b in such a manner that signals are read from either only one of the field memory 505a and the field memory 505b in accordance with the odd number/even number selection signal. A line of signals read from one of the field memories 505a and 505b are transmitted to the selector 501 and also stored temporarily in the line memory 506. When a line of signals are read from the field memory 505, then signals on the same line stored in the line memory 506 are read, next, a subsequent line of signals are read from the field memory 505, and then signals on the same line are read from the line memory 506. This process is repeated in a similar way. In this case, for example, in a case where the odd number line image is used to regenerate image signals according to the non-interlace scheme, signals on the odd number of lines located immediately before are copied in the form of signals on the even number of lines adjacent to immediately after. The image signals according to the non-interlace scheme thus regenerated are fed to the selector 501. At that time, the selection signal has been switched over in a direction that images read from the VTR 706 are regenerated, and image signals read from the field memory 505 or the line memory 506 are fed via the selector 501 to the CRT display 707, so that the CRT display 707 displays the images recorded on the VTR 706.

While images read from the VTR 706 and displayed on the CRT display 707 involve a possibility of an occurrence of the false image explained referring to FIGS. 11(A)–11(D), when the images according to the non-interlace scheme are regenerated from both the odd number line image and the even number line image in accordance with the image mode selection signal, it is possible to expect a high quality of image except for a point of the false image. On the other hand, when the images according to the non-interlace scheme are regenerated from either one of the odd number line image and the even number line image, it is possible to expect images free from the false image.

Incidentally, according to the above explanation, a mode is switched over in accordance with the image mode selection signal between the mode in which the images according to the non-interlace scheme are regenerated from both the odd number line image and the even number line image, and the mode in which the images according to the non-interlace scheme are regenerated from either one of the odd number line image and the even number line image. However, it is acceptable that it is so arranged that the images according to the non-interlace scheme are always regenerated from either one of the odd number line image and the even number line image, without setting of the mode selection.

Further, according to the above explanation, in the event that the images according to the non-interlace scheme are regenerated from either one of the odd number line image and the even number line image, a mode is switched over in accordance with the odd number/even number selection signal between a mode in which the images according to the non-interlace scheme are regenerated from the odd number line image, and a mode in which the images according to the non-interlace scheme are regenerated from the even number line image. However, it is acceptable that it is so arranged that the images according to the non-interlace scheme are always regenerated based on only the odd number line image, for example, without the mode selection.

Figure 4:
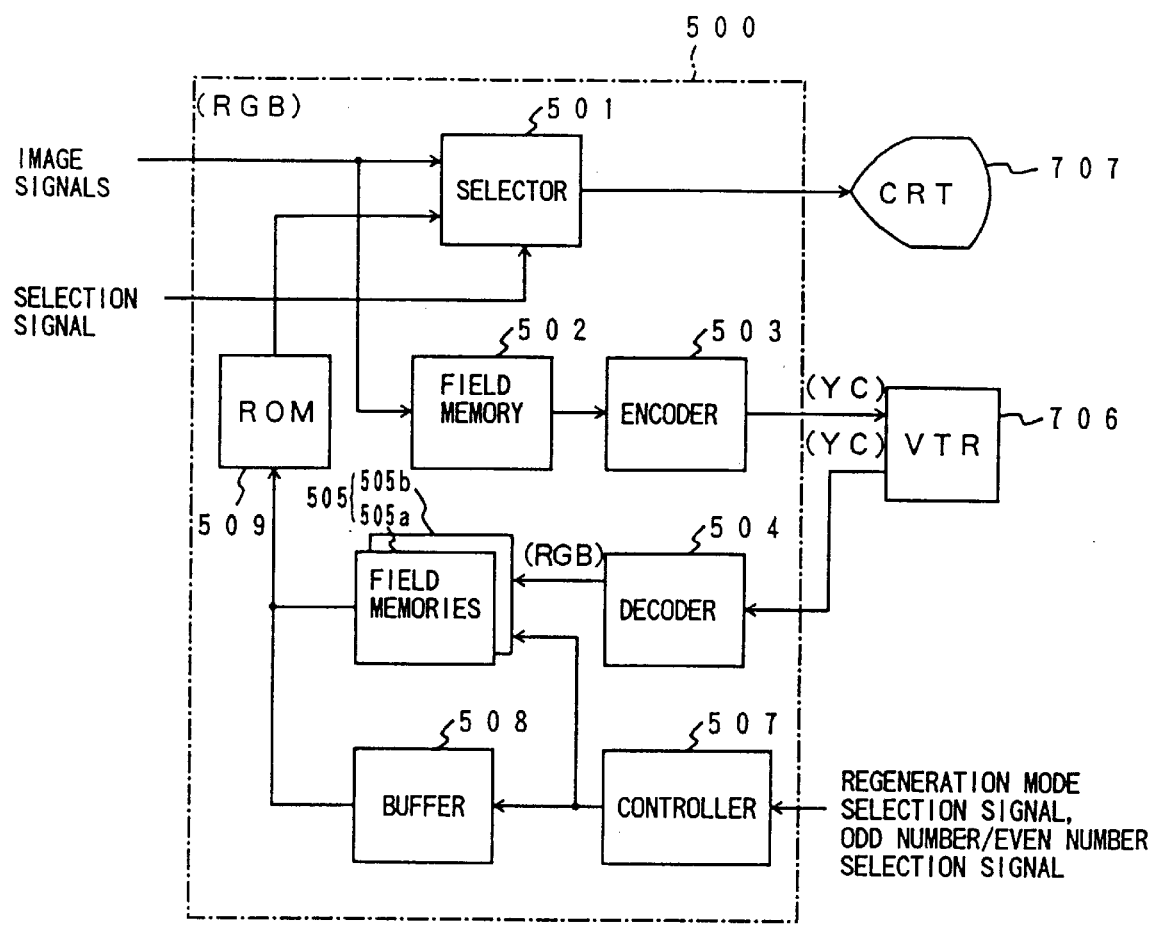
FIG. 4 is a block diagram showing by way of example a second structure of the display control unit of the ultrasonic diagnostic apparatus shown in FIG. 2.

FIG. 4 is a block diagram showing by way of example a second structure of the display control unit of the ultrasonic diagnostic apparatus shown in FIG. 2. A difference between it and the first structure shown in FIG. 3 will be described hereinafter.

In the display control unit 500 shown in FIG. 4, as compared with the display control unit 500 shown in FIG. 3, there are provided a buffer 508 instead of the line memory 506, and in addition a ROM 509.

The buffer 508 stores therein beforehand a blank signal representative of a level of "black" of images to be displayed on the CRT display 707. For example, in the event that regeneration of image signals according to the non-interlace scheme from for example, only the odd number line image is instructed in accordance with the regeneration mode selection signal and the odd number/even number selection signal, the blank signal read from the buffer 508 is allocated to the even number line. In this case, an image is expressed by only the odd number lines. In this manner, when the blank signals representative of luminance values of black are allocated every other line, the image becomes low in luminance as a whole. In view of the foregoing, the ROM 509 is used to store therein beforehand a look up table for luminance transform so that the regenerated image signals according to the non-interlace scheme are corrected in luminance by the look up table. The corrected image signals are transmitted via the selector 501 to the CRT display 707 to display thereon images corrected in luminance.

As in the second structure shown in FIG. 4, in the event that images according to the non-interlace scheme are regenerated from either one of the odd number line image and the even number line image, it is acceptable that a predetermined luminance value (here, a luminance value representative of "black") is allocated every other line. And in the event that a predetermined luminance value is allocated, it is preferable that a luminance, which is varied owing to the allocation, when the image is viewed as a whole, is corrected.

Figure 5:
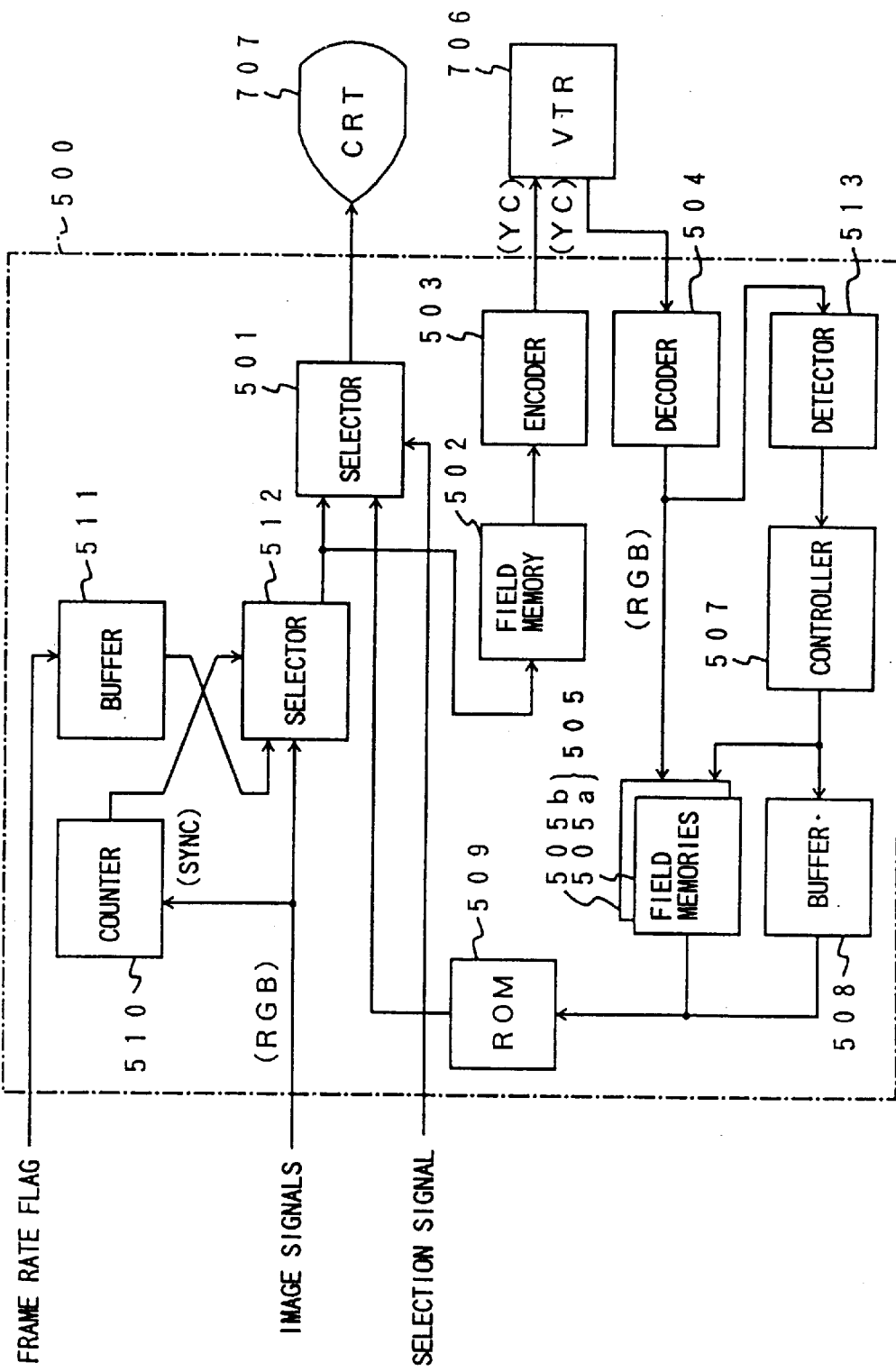
FIG. 5 is a block diagram showing by way of example a third structure of the display control unit of the ultrasonic diagnostic apparatus shown in FIG. 2.

FIG. 5 is a block diagram showing by way of example a third structure of the display control unit of the ultrasonic diagnostic apparatus shown in FIG. 2. A difference between it and the second structure shown in FIG. 4 will be described hereinafter.

In the display control unit 500 shown in FIG. 5, as compared with the display control unit 500 shown in FIG. 4, there are provided additionally a counter 510, a buffer 511, a selector 512 and a detector 513. The controller 507 receives a frame rate flag (which will be described later) from the detector 513, instead of the regeneration mode selection signal and the odd number /even number selection signal.

The buffer 511 receives and stores therein through the CPU 901 a frame rate flag indicating whether a frame rate of an image obtained through transmission and reception of ultrasonic waves, that is, a frame rate of an image signal fed via the image bus 903 (cf. FIG. 2) to the display control unit 500 is a frame rate (this is referred to as a high frame rate) which is the same as 30 frames/sec dealt with in the VTR 706 or more. This frame rate is generated in the CPU 101 in accordance with an operation of the frame rate setting button 7012 of the control panel 701.

Image signals fed via the image bus 903 involve synchronization signals. The counter 510 receives and counts the synchronization signals to detect a portion of the image signals which has no effect on an image to be displayed. Information thus detected is informed to the selector 512. The selector 512 usually permits image signals to pass through, but permits the frame rate flag stored in the buffer 511 to pass through only with respect to the portion of the image signals designated by the counter 510. Thus, in the image signals outputted from the selector 512, the frame rate flag is written in the portion of the image signals which has no effect on displaying. The VTR 706 records thereonto a YC signal having such a frame rate flag.

After the YC signal is read from the VTR 706, it is converted into signals of RGB, and then in a similar fashion to that of the second structure explained referring to FIG. 4 the signals of RGB are fed to the field memory 505 and also to the detector 513. The detector 513 detects the frame rate flag written in the signals entered, and transmits the detected frame rate flag to the controller 507. In the event that the frame rate flag thus detected offers the high frame rate, the controller 507 controls the field memory 505 and the buffer 508 in such a manner that image signals according to the non-interlace scheme are regenerated fixedly based on only the odd number line image, of the odd number line image and the even number line image. On the other hand, in the event that the frame rate flag detected in the detector 513 offers the low frame rate, the controller 507 controls the field memory 505 in such a manner that image signals according to the non-interlace scheme are regenerated on the basis of both the odd number line image and the even number line image.

As shown in the third structure by way of example, it is acceptable that the regeneration mode of images read from the VTR 706 is automatically switched over.

Figure 6:
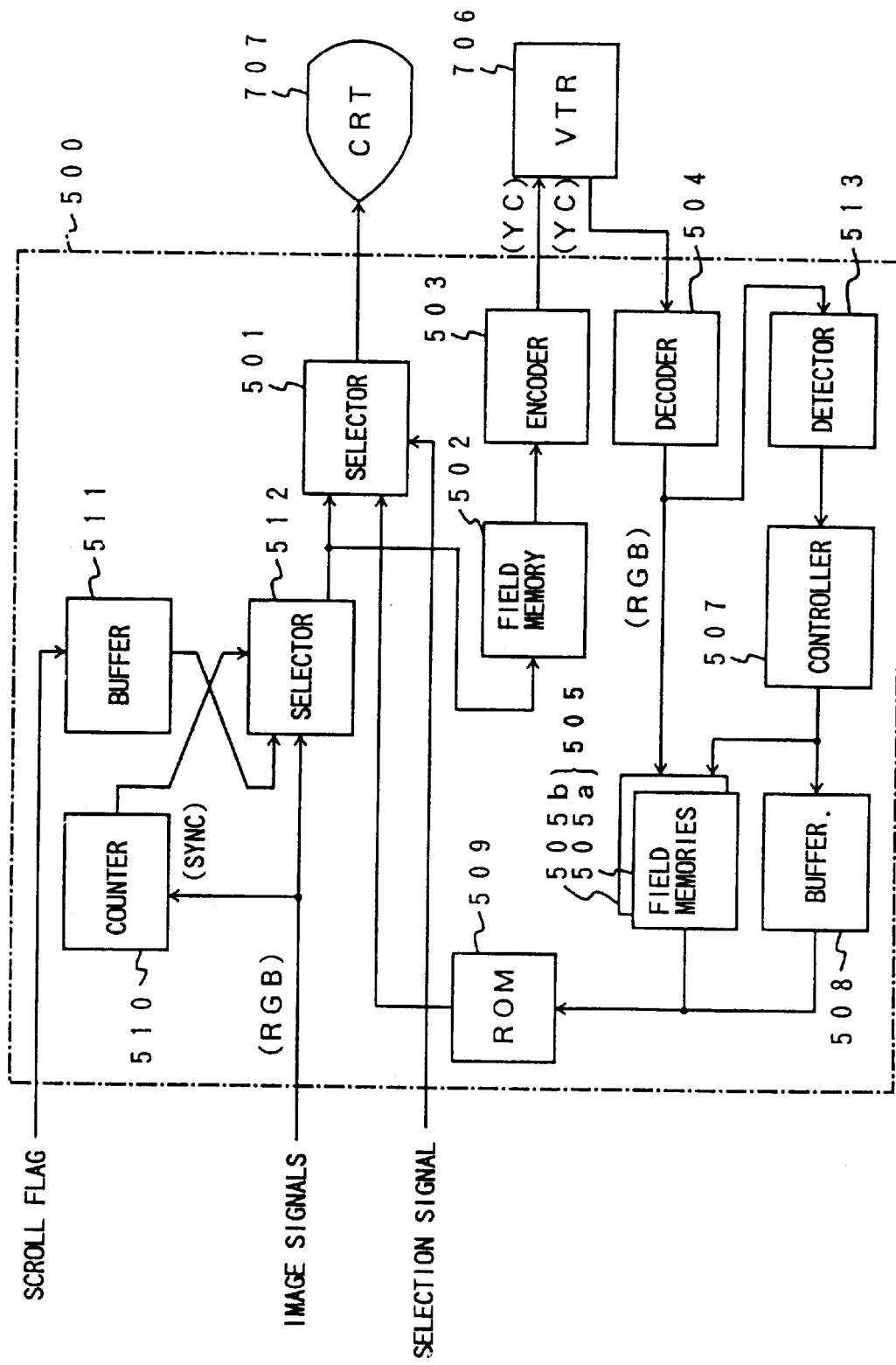
FIG. 6 is a block diagram showing by way of example a fourth structure of the display control unit of the ultrasonic diagnostic apparatus shown in FIG. 2.

FIG. 6 is a block diagram showing by way of example a fourth structure of the display control unit of the ultrasonic diagnostic apparatus shown in FIG. 2. A difference between it and the third structure shown in FIG. 5 will be described hereinafter.

The buffer 511 stores therein a scroll flag indicating whether an image signal representative of a scroll image is fed via the image bus 903 (cf. FIG. 2) to the display control unit 500, the scroll flag being fed via CPU bus 901 to the buffer 511. The scroll flag is generated in the CPU 101 on the basis of an operation of the display mode selection button 7015 of the control panel 701.

Image signals fed via the image bus 903 involve synchronization signals. The counter 510 receives and counts the synchronization signals to detect a portion of the image signals which has no effect on an image to be displayed. Information thus detected is informed to the selector 512. The selector 512 usually permits image signals to pass through, but permits the frame rate flag stored in the buffer 511 to pass through only with respect to the portion of the image signals designated by the counter 510. Thus, in the image signals outputted from the selector 512, the scroll flag is written in the portion of the image signals which has no effect on displaying. The VTR 706 records thereonto a YC signal having such a scroll flag.

After the YC signal is read from the VTR 706, it is converted into signals of RGB, and then the signals of RGB are fed to the field memory 505 and also to the detector 513. The detector 513 detects the scroll flag written in the signals entered, and transmits the detected scroll flag to the controller 507. In the event that the scroll flag thus detected indicates that the scroll image is included, the controller 507 controls the field memory 505 and the buffer 508 in such a manner that image signals according to the non-interlace scheme are regenerated fixedly based on only the odd number line image, of the odd number line image and the even number line image. On the other hand, in the event that the scroll flag detected in the detector 513 indicates that the scroll image is not included, the controller 507 controls the field memory 505 in such a manner that image signals according to the non-interlace scheme are regenerated on the basis of both the odd number line image and the even number line image.

As shown in the fourth structure by way of example, also in the event that the scroll flag is used instead of the frame rate flag, it is possible to implement the structure of the display control unit in a similar fashion to that of the use of the frame rate flag.

Figure 7:
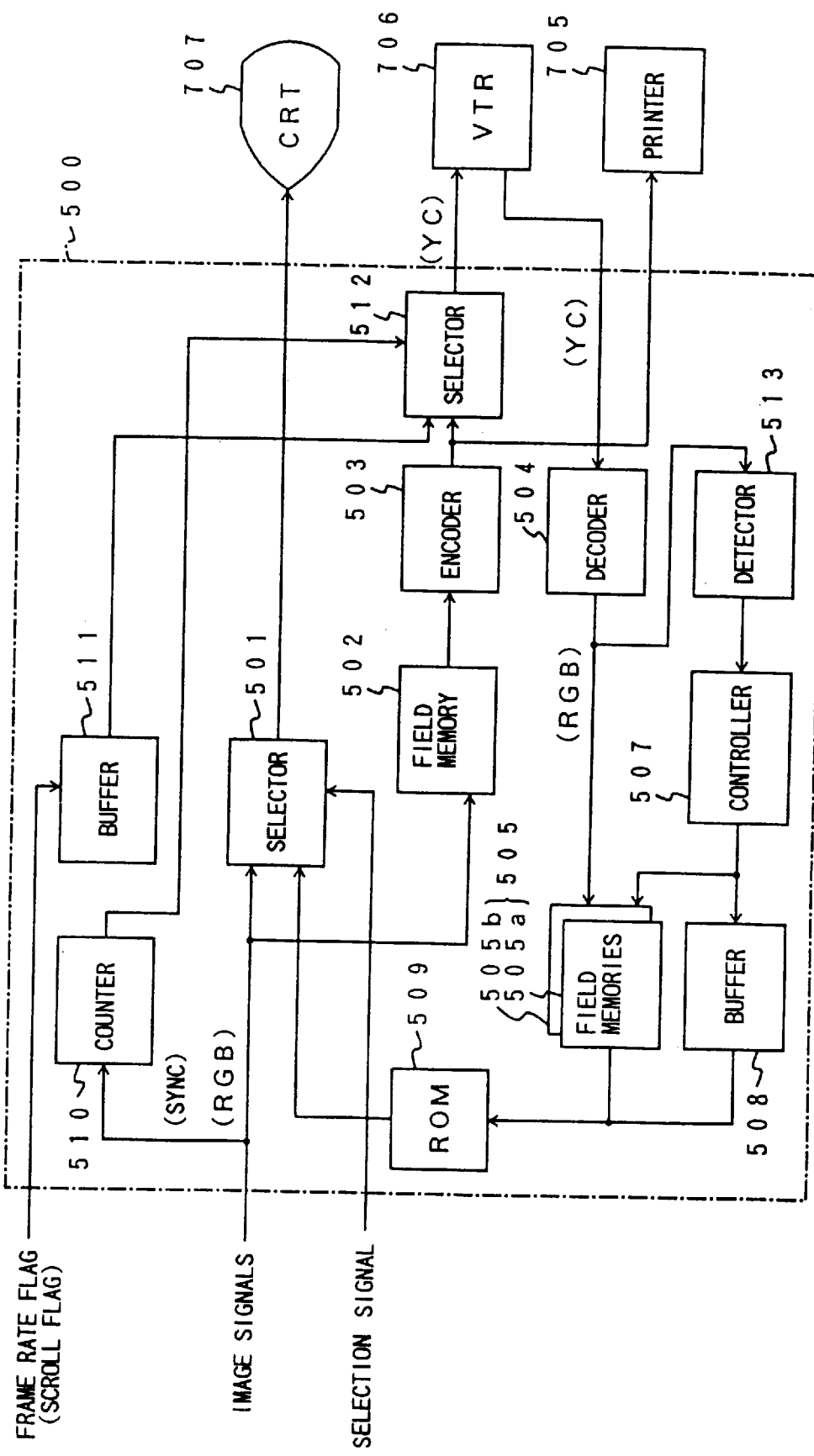
FIG. 7 is a block diagram showing by way of example a fifth structure of the display control unit of the ultrasonic diagnostic apparatus shown in FIG. 2.

FIG. 7 is a block diagram showing by way of example a fifth structure of the display control unit of the ultrasonic diagnostic apparatus shown in FIG. 2. A difference between it and the third structure shown in FIG. 5 will be described hereinafter.

According to the third structure shown in FIG. 5, the selector 512 directly receives image signals coming via the image bus 903 (cf. FIG. 2). On the other hand, according to the fifth structure shown in FIG. 7, the selector 512 is located after the encoder 503. And further, according to the fifth structure shown in FIG. 7, there is shown the printer 705 as shown in FIG. 2.

In some cases, for example, according to a way of the printer 705, it happens that a portion of image signals, which has no effect on a display image to be printed by the printer 705, is different from a portion of image signals, which has no effect on an image to be displayed on the CRT display 707. For this reason, according to the fifth structure, the selector 512 is disposed immediately before the VTR 706 so as to avoid a bad influence on another device (e.g. the printer 705), which will be caused by insertion of the frame rate flag. With respect to other points in the fifth structure, they are similar as to the matter of the third structure shown in FIG. 5.

Also in the fifth structure shown in FIG. 7 by way of example, it is possible to adopt the scroll flag instead of the frame rate flag, in a similar fashion to that of the third structure shown in FIG. 5 and the fourth structure shown in FIG. 6.

Figure 8:
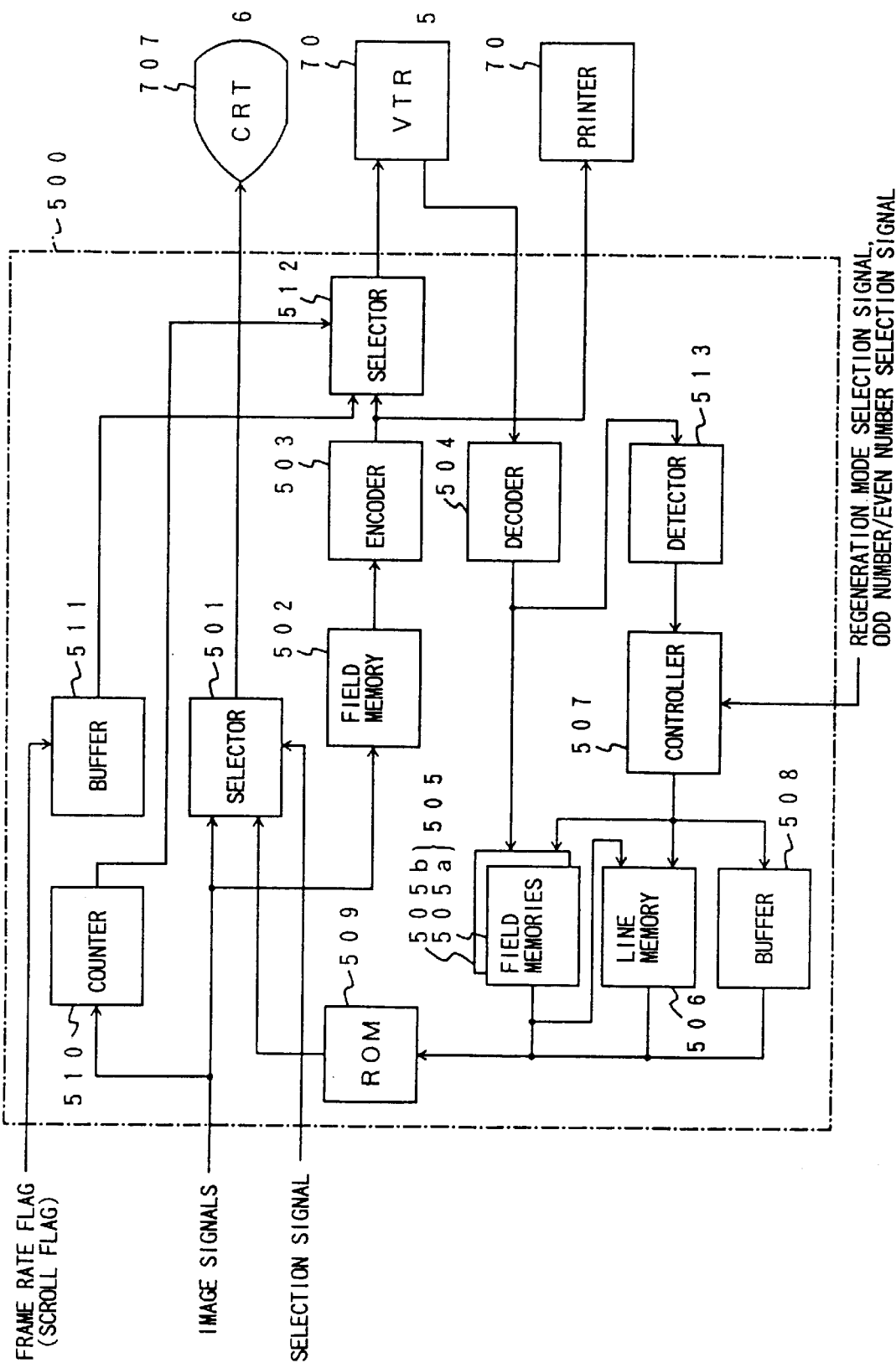
FIG. 8 is a block diagram showing by way of example a sixth structure of the display control unit of the ultrasonic diagnostic apparatus shown in FIG. 2.

FIG. 8 is a block diagram showing by way of example a sixth structure of the display control unit of the ultrasonic diagnostic apparatus shown in FIG. 2. A difference between it and the fifth structure shown in FIG. 7 will be described hereinafter.

According to the sixth structure shown in FIG. 8, as compared with the fifth structure shown in FIG. 7, the controller 507 receives not only the frame rate flag from the detector 513, but also the regeneration mode selection signal and the odd number /even number selection signal, also shown in the first structure shown in FIG. 3.

In the event that the frame rate flag indicates the low frame rate, the controller 507 controls the field memory 505 in such a manner that image signals according to the non-interlace scheme are generated on the basis of both the odd number line image and the even number line image, regardless of the regeneration mode selection signal. On the other hand, in the event that the frame rate flag indicates the high frame rate, the controller 507 controls the field memory 505 in such a manner that image signals according to the non-interlace scheme are generated, in accordance with the regeneration mode selection signal, on the basis of both the odd number line image and the even number line image, in a similar fashion to that of the low frame rate, on the basis of either one of the odd number line image and the even number line image and by means of copying every other line as explained referring to FIG. 3, or on the basis of either one of the odd number line image and the even number line image and by means of the blank signals being allocated every other line as explained referring to FIG. 4. That is, according to the sixth structure shown in FIG. 8, the regeneration mode selection signal is effective only in the event that it is concerned with the high frame rate, and serves as a signal of selecting one of three types of non-interlace image generating schemes. Thus, the regeneration mode selection button 7013 of the control panel 701 shown in FIG. 2 is so arranged that anyone of such three types of non-interlace image generating schemes can be optionally selected.

It is acceptable that the display control unit is arranged in such a manner that as in the sixth structure shown in FIG. 8, various regeneration modes are prepared and switched over in accordance with an instruction of an operator.

Also in the sixth structure shown in FIG. 8 by way of example, it is possible to adopt the scroll flag instead of the frame rate flag, in a similar fashion to that of the fifth structure shown in FIG. 7. In such a case, in a similar fashion to a relationship between the third structure shown in FIG. 3 and the fourth structure shown in FIG. 6, a matter as to whether the scroll flag indicates that a scroll image is included corresponds to a matter as to whether the frame rate flag indicates that it is concerned with a high frame rate.

Figure 9:
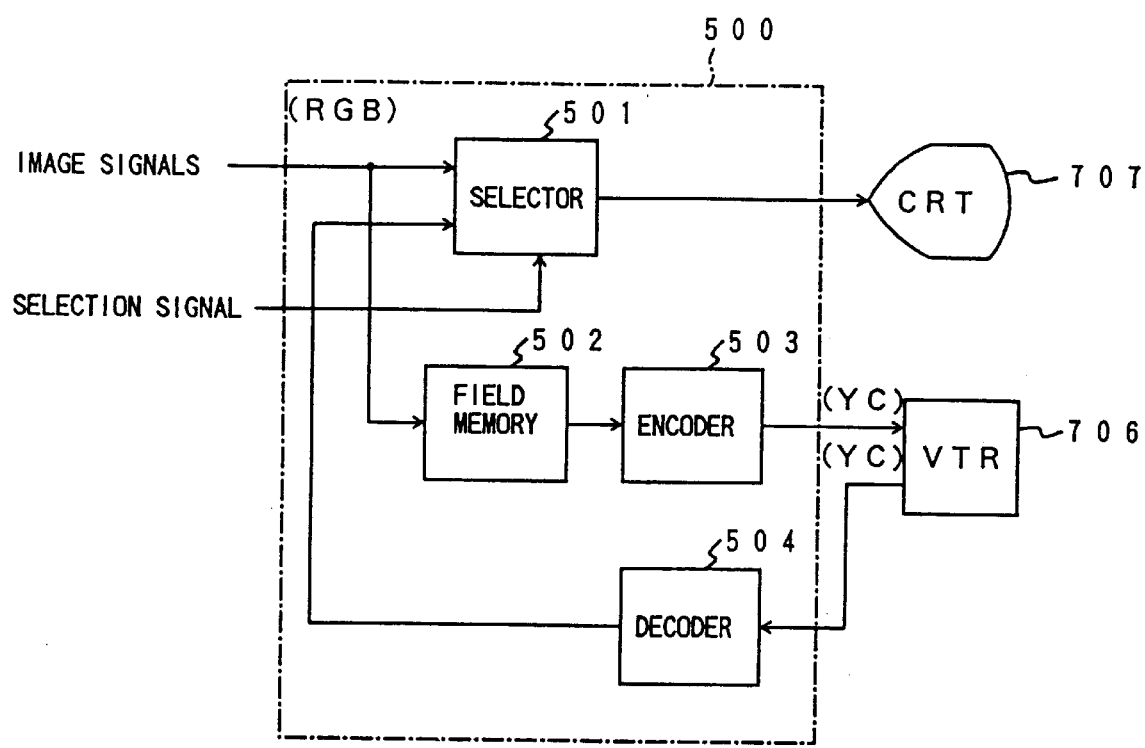
FIG. 9 is a block diagram showing by way of example a seventh structure of the display control unit of the ultrasonic diagnostic apparatus shown in FIG. 2.

FIG. 9 is a block diagram showing by way of example a seventh structure of the display control unit of the ultrasonic diagnostic apparatus shown in FIG. 2. It is noted that the seventh structure shown in FIG. 9 is not applicable directly to the ultrasonic diagnostic apparatus explained referring to FIG. 2, and as the CRT display 707 shown in FIG. 2, there is a need to provide a CRT display of a non-interlace/interlace selection scheme. Hereinafter, seventh structure shown in FIG. 9 will be explained on the assumption that the ultrasonic diagnostic apparatus shown in FIG. 2 is provided with a CRT display 707 of a non-interlace/interlace selection scheme.

When the selector 501 is changed over in an operation mode so as to permit image signals fed via the image bus 903 to pass through, the image signal entered is fed via the selector 501 to the CRT display 707 so as to display an image according to the non-interlace scheme on the basis of the entered image signal. The entered image signals are further inverted to YC signals according to the non-interlace scheme through the field memory 502 and the encoder 503 and then recorded onto the VTR 706. In this respect, it is similar to that of the first structure shown in FIG. 3.

While YC signals read from the VTR 706 are converted to image signals of RGB by the decoder 504, the image signals are maintained as image signals according to the non-interlace scheme. Thus, when the selection signal indicates that a regeneration image outputted from the VTR 706 is displayed, the image signals according to the non-interlace scheme are transferred via the selector 501 to the CRT display 707, as they are. In this case, the CRT display 707 displays images according to the non-interlace scheme in accordance with the image signals according to the non-interlace scheme.

This makes it possible to regenerate images which are of extended definition and involves no occurrence of false images as explained referring to FIGS. 11 (C) and (D). It is noted, in this case, that there is a need to provide a CRT display of a non-interlace/interlace selection scheme, with which the usual ultrasonic diagnostic apparatus is not provided.

As explained above, according to the present invention, it is possible to provide an ultrasonic diagnostic apparatus having a function that a regeneration of images recorded on a VTR involves no occurrence of false images, or alternatively simply produces false images which are hard to be conspicuous.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

I claim:

1. An ultrasonic diagnostic apparatus comprising:

an ultrasonic transmit-receive unit for repeating a process that ultrasonic waves are transmitted into a subject, and the ultrasonic waves reflected within the subject are received to obtain received signals;

an image generating unit for sequentially generating a plurality of frames of image signals according to a non-interlace scheme in accordance with the received signals obtained in said ultrasonic transmit-receive unit;

an image signal transformation unit for transforming the image signals according to the non-interlace scheme sequentially generated in said image generating unit into image signals according to an interlace scheme;

a recording unit for recording the image signals according to the interlace scheme obtained in said image signal transformation unit;

an image regenerating unit for regenerating image signals according to the non-interlace scheme using only either one of image signals representative of images on odd number lines and images on even number lines, which constitute the image signals according to the interlace scheme read from said recording unit; and an image display unit according to the non-interlace scheme for displaying images based on the image signals generated in said image generating unit and images based on the image signals regenerated in said image regenerating unit.

2. An ultrasonic diagnostic apparatus according to claim 1, wherein said image regenerating unit generates a first image signal in accordance with a second image signal representative of a line included in one of an image on the odd number line and an image on the even number line, said first image signal being adjacent to the line of interest and being representative of another line not included in said one of the image on the odd number line and the image on the even number line.

3. An ultrasonic diagnostic apparatus according to claim 1, wherein said image regenerating unit generates an image signal according to the non-interlace scheme, said image signal consisting of an image signal representative of one of an image on the odd number line and an image on the even number line, and a blank signal representative of a predetermined luminance value, said blank signal being allocated to a line not included in said one of the image on the odd number line and the image on the even number line.

4. An ultrasonic diagnostic apparatus according to claim 3, wherein said ultrasonic diagnostic apparatus further comprises a luminance correction unit for correcting a luminance of an image represented by the image signal regenerated by said image regenerating unit.

5. An ultrasonic diagnostic apparatus according to claim 1, further comprising:
- a frame rate flag applying unit for applying to image signals sequentially generated in said image generating unit a frame rate flag indicative of whether a frame rate of generating said image signals is over a predetermined frame rate; and
- a frame rate flag detection unit for detecting the frame rate flag applied to the image signals read from said recording unit,
- wherein said image regenerating unit regenerates image signals according to the non-interlace scheme, using only either one of image signals representative of images on odd number lines and images on even number lines, which constitute the image signals according to the interlace scheme read from said recording unit, or alternatively using both those image signals, in accordance with an indication of the frame rate flag detected by said frame rate flag detection unit.

6. An ultrasonic diagnostic apparatus according to claim 1, further comprising:
- a scroll flag applying unit for applying to image signals sequentially generated in said image generating unit a scroll flag indicative of whether the image signals are image signals representative of images at least partially including a scroll image which is an image representative of variation inside the subject with the passage of time, said scroll image being scrolled in a time base direction; and
- a scroll flag detection unit for detecting the scroll flag applied to the image signals read from said recording unit,
- wherein said image regenerating unit regenerates image signals according to the non-interlace scheme, using only either one of image signals representative of images on odd number lines and images on even number lines, which constitute the image signals according to the interlace scheme read from said recording unit, or alternatively using both those image signals, in accordance with an indication of the scroll flag detected by said scroll flag detection unit.

7. An ultrasonic diagnostic apparatus according to claim 1, wherein said image regenerating unit regenerates image signals according to the non-interlace scheme, using only either one of image signals representative of images on odd number lines and images on even number lines, which constitute the image signals according to the interlace scheme read from said recording unit, or alternatively using both those image signals, in accordance with an instruction, and
- wherein said ultrasonic diagnostic apparatus further comprises an handler for inputting the instruction.

8. An ultrasonic diagnostic apparatus according to claim 1, further comprising:
- a frame rate flag applying unit for applying to image signals sequentially generated in said image generating unit a frame rate flag indicative of whether a frame rate of generating said image signals is over a predetermined frame rate; and
- a frame rate flag detection unit for detecting the frame rate flag applied to the image signals read from said recording unit,
- wherein in a case where the frame rate flag detected by said frame rate flag detection unit indicates a frame rate less than a predetermined frame rate, said image regenerating unit regenerates image signals according to the non-interlace scheme, using both image signals representative of images on odd number lines and images on even number lines, which constitute the image signals according to the interlace scheme read from said recording unit, and in a case where the frame rate flag detected by said frame rate flag detection unit indicates a frame rate above the predetermined frame rate, said image regenerating unit regenerates image signals according to the non-interlace scheme, using only either one of image signals representative of images on odd number lines and images on even number lines, which constitute the image signals according to the interlace scheme read from said recording unit, or alternatively using both those image signals, in accordance with an instruction, and
- wherein said ultrasonic diagnostic apparatus further comprises an handler for inputting the instruction.

9. An ultrasonic diagnostic apparatus according to claim 1, further comprising:
- a scroll flag applying unit for applying to image signals sequentially generated in said image generating unit a scroll flag indicative of whether the image signals are image signals representative of images at least partially including a scroll image which is an image representative of variation inside the subject with the passage of time, said scroll image being scrolled in a time base direction; and
- a scroll flag detection unit for detecting the scroll flag applied to the image signals read from said recording unit,
- wherein in a case where the scroll flag detected by said scroll flag detection unit indicates an absence of the scroll image, said image regenerating unit regenerates image signals according to the non-interlace scheme, using both image signals representative of images on odd number lines and images on even number lines, which constitute the image signals according to the interlace scheme read from said recording unit, and in a case where the scroll flag detected by said scroll flag detection unit indicates an presence of the scroll image, said image regenerating unit regenerates image signals according to the non-interlace scheme, using only either one of image signals representative of images on odd number lines and images on even number lines, which constitute the image signals according to the interlace scheme read from said recording unit, or alternatively using both those image signals, in accordance with an instruction, and
- wherein said ultrasonic diagnostic apparatus further comprises an handler for inputting the instruction.

10. An ultrasonic diagnostic apparatus comprising:
- an ultrasonic transmit-receive unit for repeating a process that ultrasonic waves are transmitted into a subject, and the ultrasonic waves reflected within the subject are received to obtain received signals;

an image generating unit for sequentially generating a plurality of frames of image signals according to a non-interlace scheme in accordance with the received signals obtained in said ultrasonic transmit-receive unit;

an image signal transformation unit for transforming the image signals according to the non-interlace scheme sequentially generated in said image generating unit into image signals according to an interlace scheme;

a recording unit for recording the image signals according to the interlace scheme obtained in said image signal transformation unit; and an image display unit according to a non-interlace/interlace selection scheme for displaying images based on the image signals according to the non-interlace scheme obtained in said image signal transformation unit and images based on the image signals according to the interlace scheme read from said recording unit.

* * * * *

UNITED STATES PATENT AND TRADEMARK OFFICE
CERTIFICATE OF CORRECTION

PATENT NO.  : 5,910,116
DATED       : June 8, 1999
INVENTOR(S) : Yuichiro ISHII

It is certified that error appears in the above-identified patent and that said Letters Patent is hereby corrected as shown below:

Title page, item [57],

In the Abstract:

Line 7, change "interface" to --interlace--;
Line 8, change "non-interface" to --non-interlace--.

Signed and Sealed this

Sixteenth Day of November, 1999

Attest:

Attesting Officer

Q. TODD DICKINSON

Acting Commissioner of Patents and Trademarks